July 9, 1968 K. D. SCHREYER 3,391,967

FILE CABINET

Original Filed March 15, 1966 17 Sheets-Sheet 1

INVENTOR
KENNETH D. SCHREYER

BY

Prangley, Baird, Clayton, Miller & Vogel.
ATTYS.

July 9, 1968 K. D. SCHREYER 3,391,967

FILE CABINET

Original Filed March 15, 1966 17 Sheets-Sheet 3

July 9, 1968 K. D. SCHREYER 3,391,967

FILE CABINET

Original Filed March 15, 1966 17 Sheets-Sheet 4

July 9, 1968 K. D. SCHREYER 3,391,967

FILE CABINET

Original Filed March 15, 1966 17 Sheets-Sheet 10

FILE CABINET

Original Filed March 15, 1966 17 Sheets-Sheet 13

July 9, 1968 K. D. SCHREYER 3,391,967

FILE CABINET

Original Filed March 15, 1966 17 Sheets-Sheet 15

3,391,967
FILE CABINET
Kenneth D. Schreyer, Doylestown, Pa., assignor to Lyon Metal Products, Incorporated, Aurora, Ill., a corporation of Illinois
Original application Mar. 15, 1966, Ser. No. 534,382. Divided and this application June 12, 1967, Ser. No. 662,221
15 Claims. (Cl. 312—257)

ABSTRACT OF THE DISCLOSURE

There is disclosed a file cabinet including a case having a body with a rear wall and a pair of forwardly projecting side walls integral therewith and defining a front opening therebetween, a front frame positioned between the side walls on the forward ends thereof and completely surrounding the front opening and including a plurality of projections extending outwardly toward the adjacent one of the side walls, first bodies of mastic disposed between the front frame and the side walls, the side walls being welded to the front frame at the projections thereon, a center support positioned between the side walls and disposed toward but spaced from and substantially parallel to the front frame and including a plurality of projections extending outwardly toward the adjacent one of the side walls, a top covering the area bounded by the rear wall and the side walls and having flanges extending downwardly around the periphery thereof and covering the adjacent upper ends of the rear wall and the side wall and secured thereto and extending forwardly beyond the front frame, bottom flanges integral with the bottom edges of the body and extending inwardly with respect thereto, and a bottom wall mounted on the bottom flanges and secured thereto and including a front flange extending upwardly between the side walls and covering at least a portion of the front frame; a drawer disposed in the case upon a pair of drawer suspension structures each including a case rail mounted on the case and a neutral member disposed about the case rail and a drawer rail overlying and disposed about the neutral member and mounted on the drawer, the adjacent portions of the case rail and the neutral member defining two inner ball races having first sets of balls disposed therein, and the neutral member and the drawer rail defining two outer ball races therebetween and having a second pair of balls disposed therein, the drawer being mounted on the drawer rail by pairs of drawer clips on opposite sides thereof and drawer brackets mounted adjacent to the forward ends of the drawer rails and overlying the adjacent one of the drawer clips to hold the drawer on the drawer rail, and a downturned rear flange on the rear of each of the drawer clips engaging the rear of the associated drawer rail and preventing the front end of the drawer from being lifted off the drawer rail due to the drawer brackets thereon until the rear of the drawer has been lifted and the drawer moved bodily rearwardly to clear the drawer brackets from the associated drawer clips; the drawer having a drawer head formed of an outer front wall fixedly disposed with respect to the bottom side walls thereof and an inner front wall removably mounted thereon with a body of rigid cellular construction disposed therebetween and adhesively secured thereto; there is also provided an improved combination pull and latch and a cooperating improved lock structure for latching and locking the drawer with respect to the case; and finally, there has been provided in the housing of the case knockouts which can be removed to provide aligned openings between adjacent cases through which a fastener can be inserted for interconnecting adjacent cases to form an integrated row of cases.

This application is a divisional application of the copending application Ser. No. 534,382 filed Mar. 15, 1966, now Patent No. 3,368,859, for File Cabinet.

This invention relates to file cabinet constructions, and particularly to improved file cases therefor.

It is a general object of the invention to provide an improved case for a file cabinet including specifically an improved front frame and an improved center frame or support that prevent the case from "racking" when one corner of the case is lifted.

In connection with the foregoing object, another object of the invention is to provide an improved file cabinet case wherein the front and center frames are of ladder construction incorporating cross members of unique and improved design, the frames being welded to the outer walls of the case to provide good connection therewith.

Yet another object of the invention is to provide an improved file cabinet case of the type set forth wherein a layer of mastic is disposed between the outer walls of the case and the frames at the areas of attachment therebetween to provide extra bonding good sound deadening qualities therein.

A further object of the invention is to provide improved structure for interconnecting a pair of adjacent file cabinet cases to form an assembled unit therefrom.

Further features of the invention pertain to the particular arrangement of the parts and the interconnection thereof whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
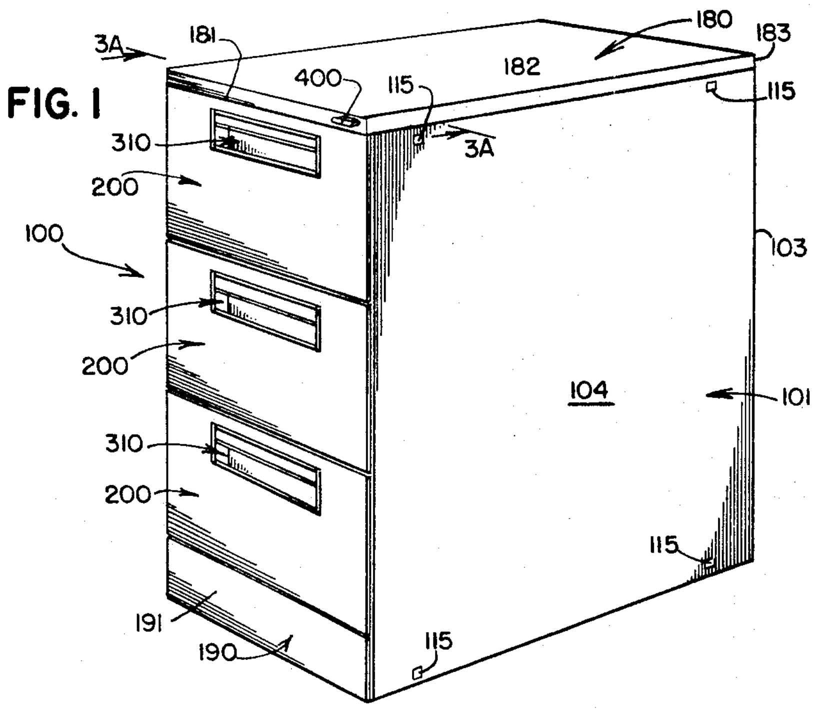
FIGURE 1 is a perspective view of a file cabinet made in accordance and embodying therein the principles of the present invention, a three-drawer file cabinet having been shown for purposes of illustration.
Figure 2:
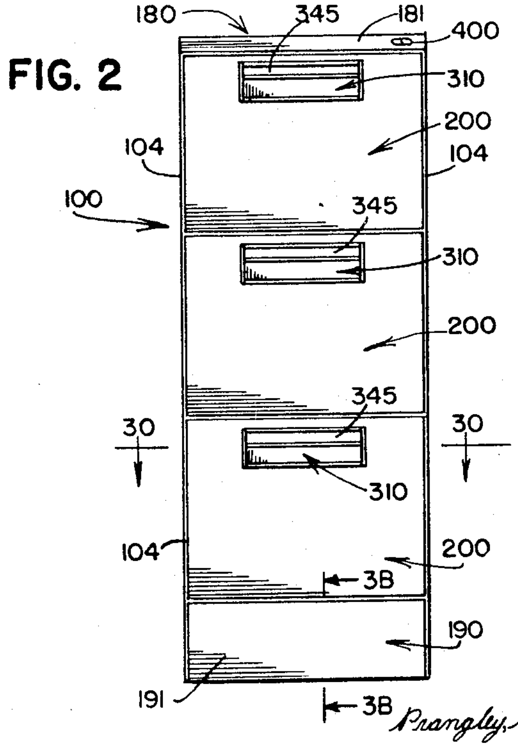
FIG. 2 is a front elevational view of the file cabinet of FIG. 1.

Referring now to the drawings, and particularly to FIGS. 1 and 2 thereof, there is illustrated a file cabinet 100 made in accordance with and emboding the principles of the present invention, a three-drawer file cabinet having three drawers therein having been shown for purposes of illustration. The file cabinet 100 includes a case 101, a top 180, a base 190 and three file drawers 200 disposed therein. Each of the file drawers 200 is provided with the combination pull and latch 310 and a lock 400 is provided for locking the drawers 200 in the fully closed positions illustrated.

Referring now to FIGS. 1 to 12 of the drawings, additional details of construction of the case 101 will be described. The case 101 includes a body 102 (see particularly FIG. 5) including a substantially rectangular rear wall 103 and a pair of substantially rectangular side walls 104 extending forwardly therefrom and disposed substantially perpendicular thereto and parallel to each other. The upper edge of the rear wall 103 carries a top rear flange (not shown) offset inwardly and the upper edges of the side walls 104 carry top side flanges 106 that are likewise offset inwardly (see FIG. 3), cutouts (not shown) being provided at the rear corners to accommodate such offsetting of the named flanges. The lower edge of the rear wall 103 likewise carries a bottom rear flange (not shown) disposed substantially normal to the wall 103 and extending inwardly and the lower edges of the side walls 104 likewise carry inwardly directed bottom side flanges 109 disposed substantially perpendicular thereto. The forward edges of the side walls 104 carry inwardly and rearwardly directed front flanges 110 (see FIG. 5) disposed at an acute angle of approximately 45° with respect to the associated side wall 104, the flanges 110 extending vertically substantially the entire height of the case 101. Provided in each of the four corners of the side walls 104 are indentations or partial slits forming knockouts 115 (see FIG. 1), the knockouts 115 being flush and substantially square in shape and being readily removable upon being hit by a tool to provide square openings for interconnecting adjacent cases 101 as will be described more fully hereinafter.

Disposed at the forward portion of the case 101 is a front frame 120, the details of construction of which are best illustrated in FIGS. 3 and 5 to 8, inclusive, and from these views it will be seen that the frame 120 includes a pair of vertically arranged channels 121 that are generally U-shaped in cross section, each including a main wall 122 and a pair of side flanges 123. The channels 121 extend substantially the entire height of the cabinet 100 and are joined at the upper ends thereof by a top cross brace 130, the cross brace 130 being generally U-shaped in cross section and including a substantially rectangular main wall 131 (see FIG. 6) on the upper edge of which is disposed a top flange 132 extending substantially normal to the main wall 131. The main wall 131 has a lower edge 133 that curves downwardly at the ends thereof and is provided thereon with a correspondingly shaped bottom flange 134. There further is formed in the main wall 131 a generally rectangular slot 135 which receives the locking mechanism to be described more fully hereinafter.

Referring to FIG 3, it will be seen that the top cross brace 130 is secured as by welding to the rear one of the side flanges 123 on the channels 121. The lower ends of the channels 121 are likewise connected by a bottom cross brace 140 which includes a main wall 141 disposed substantially vertically, a bottom flange 142 disposed along the lower edge of the main wall 141 and extending rearwardly therefrom and substantially normal thereto, the upper edge 143 of the cross brace 140 being curved upwardly at the outer ends and carrying thereon a top flange 144 extending rearwardly therefrom. The main wall 141 is suitably secured as by welding to the rearmost one of the side flanges 123 of the lower ends of the channels 121 whereby to interconnect the same. To this end it is noted that the construction of the bottom brace 140 is identical to that of the top cross brace 130, except that no slot 135 is provided therein.

Finally, two center tie braces 150 are provided interconnecting the channels 121 at points disposed between the adjacent ones of the drawers 200. The construction of each of the center tie braces 150 is substantially identical one to the other and referring to FIG. 8 it will be seen that each comprises a main wall 151 having a narrow central portion 152 and upwardly and outwardly extending top edges that terminate in the broadest portions of the main wall 151 at the outer ends thereof. A top flange 154 is provided on the upper edge 153 on the main wall 151 and includes a relatively wide central portion 155 from which extend laterally and outwardly two upwardly directed portions 156 that extend to the outer edges of the main wall 151. The lower edge 157 on the main wall 151 curves downwardly at the outer ends thereof as at 158 and carries thereon a bottom flange 159 disposed substantially normal to the main wall 151. Each of the center tie braces 150 is suitably secured as by welding to the rearmost one of the side flanges 123 of the front frame channels 121, the flanges 154 and 159 being directed rearwardly. Also mounted on the lower ends of the channels 121 and specifically on the forwardmost one of the side flanges 123 thereof are base clips 160 (see FIG. 3) each including an attachment flange 161 secured as by welding to the adjacent channel 121, an outwardly extending wall 162 disposed substantially normal to the flange 161 and terminating in a holding flange 163 directed inwardly.

Also disposed within the case 101 and between the side walls 104 intermediate the front and rear edges thereof is a center support 170, the details of construction of which are best illustrated in FIGS. 5 to 12, of the drawings. The center support 170 includes a pair of upstanding channels 171 that are generally U-shaped in cross section and each including a main wall 172 and a pair of vertically and outwardly extending side flanges 173, the upper and lower ends of each of the side flanges 173 carrying cutouts 174 therein. Suitably connected as by welding to the rearmost one of the flanges 173 are two of the center tie braces 150, the tie braces 150 on the center support 170 being in general longitudinal alignment with the tie braces 150 on the front frame 120.

Figures 30, 31:
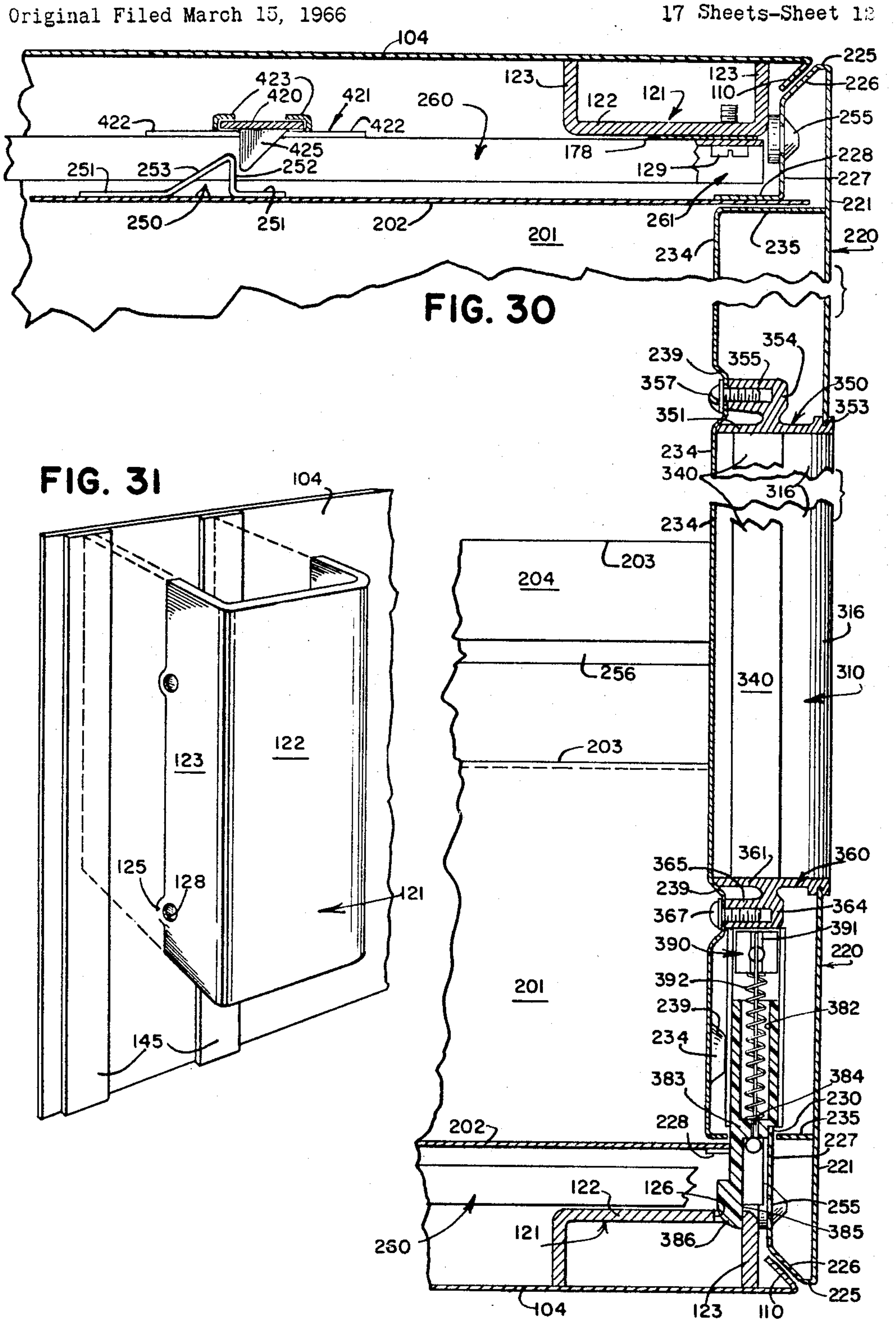
FIG. 30 is an enlarged fragmentary view with certain parts broken away and illustrating the latching and locking mechanisms, the section being taken substantially along the line 30—30 of FIG. 2.
FIG. 31 is an enlarged perspective view illustrating the interconnection between the case frame and the side walls thereof.

Referring to FIG. 31, the manner of interconnecting the side walls 104 and the front frame 120 and the center support 170 is illustrated. There is shown in FIG. 31 a portion of one of the front channels 121 and it will be seen that the side flanges 123 thereof have been struck or deformed as at 128 to provide outwardly extending welding projections 125 on each of the outer edges of the side flanges 123, the welding projections 125 being preferably arranged in pairs as illustrated. Applied to the inner surface of the side wall 104 are two strips of mastic 145, the layer 145 being approximately 1/16" thick and approximately 1/2" wide and being disposed opposite the welding projections 125. Preferably the mastic in the layer 145 is a heat curing resin such as that sold under the trademark "Presstite" No. 719. The side wall 104 is welded to the projections 125 and during the welding operation the synthetic organic resin forming a part of the mastic in the layer 145 is partially cured and subsequent heating of the cabinet 100 during the drying of the paint thereon serves fully to cure the resin in the mastic layer 145. The resultant bond between the side walls 104 and the front frame 120 and between the side walls 104 and the center support 170 is unusually strong and in addition serves to deaden sound transmission between the various parts.

A top 180 is provided to cover the area defined by the rear wall 103 and the side walls 104, the top 180 including a front flange 181 on the forward edge thereof, a pair of side flanges 182 on the side edges thereof and a rear flange 183 on the rear edge thereof, the various flanges named being disposed substantially normal to the top 180 and being joined at the four corners thereof and fitting over and receiving therein the top flanges on the upper edges of the rear wall 103 and the side walls 104 of the body 102, see FIG. 3, for example. By this construction, the outer surface of the various top flanges 182 and 183 are disposed in vertical alignment with the associated body walls, and more specifically the outer surfaces of the flanges lie in the same plane as the outer surfaces of the associated body walls. A bottom 185 is disposed in contact with the bottom flanges of the body 102 and is secured thereto as by welding to close the lower end of the case 101, the bottom 185 including a front flange 186 extending upwardly between the side walls 104, the flange 186 covering at least a portion of the front frame 120. Finally, a base 190 is provided closing the space between the bottom 185 and the lower edge of the bottommost drawer 200, the base 190 including a front wall 191 that extends upwardly and is suitably secured to the base clips 160 as by welding, the base 190 covering the bottom front flange 186.

The resultant completed file cabinet case 101 is unusually rigid and strong and is essentially of unitary construction, the novel frame structure including the ladder formation and the cross members of unique design and the novel attachment of the body 102 of the frame members prevents the cabinet case 101 from "racking" when one corner thereof is lifted. The novel bonding between the file cabinet body 102 and the frames also offers a good sound deadening effect as well as providing an improved bond between the parts.

Figures 13, 14:
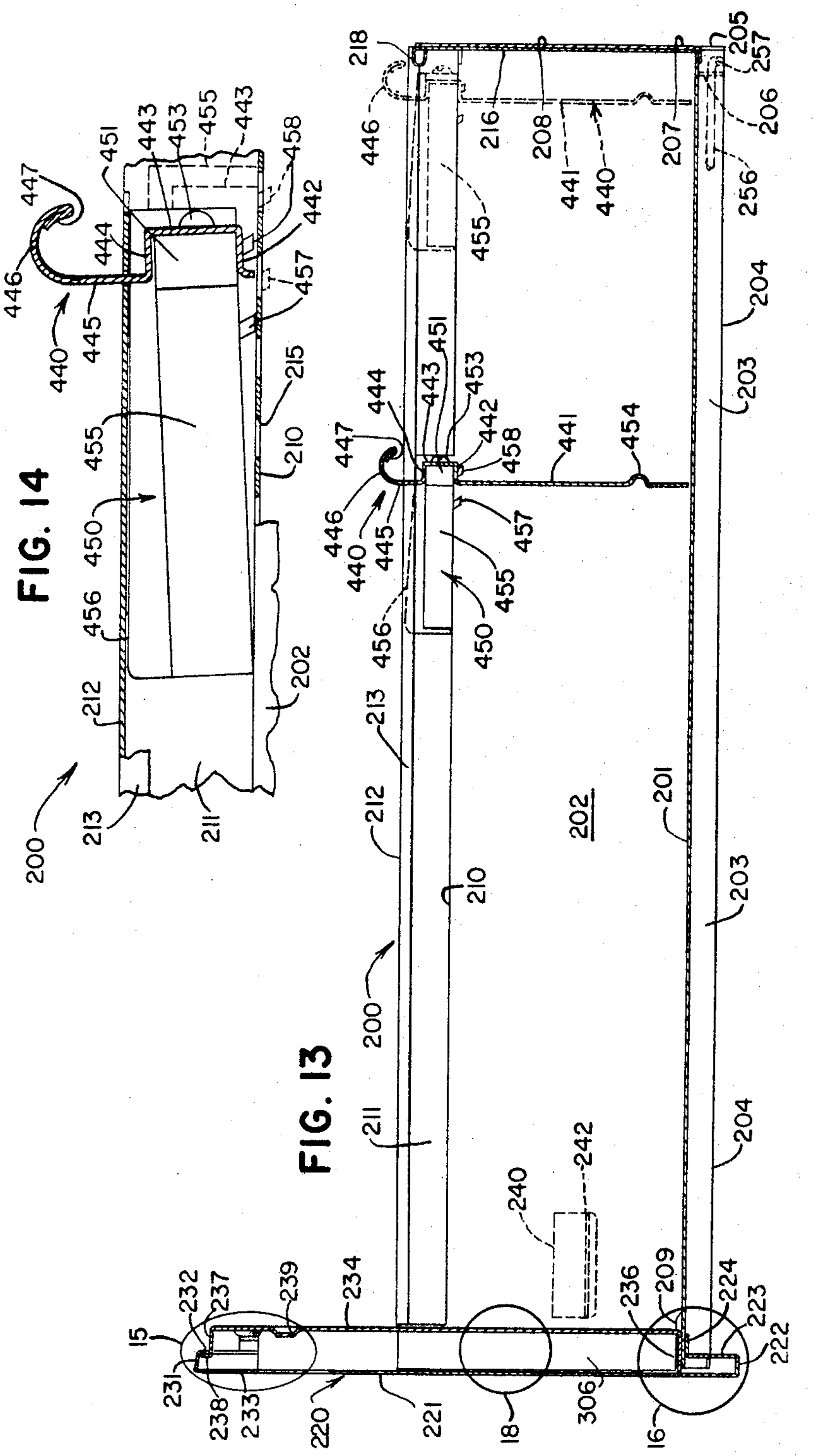
FIG. 13 is a view in vertical longitudinal section through a file drawer.
FIG. 14 is an enlarged fragmentary view illustrating the operation of the compressor plate.
Figure 15:
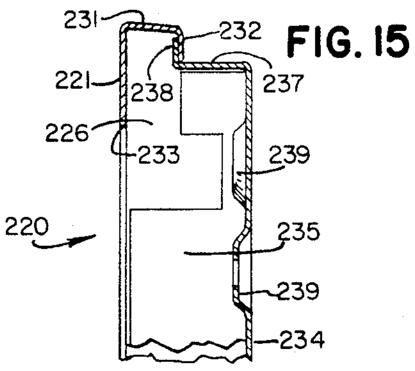
FIG. 15 is an enlarged view of the portion of the drawer head within the circle identified by the numeral 15 in FIG. 13.
Figure 16:
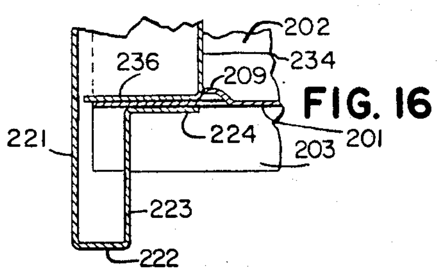
FIG. 16 is an enlarged view of the portion of the drawer head within the circle identified by the numeral 16 in FIG. 13.
Figure 18:
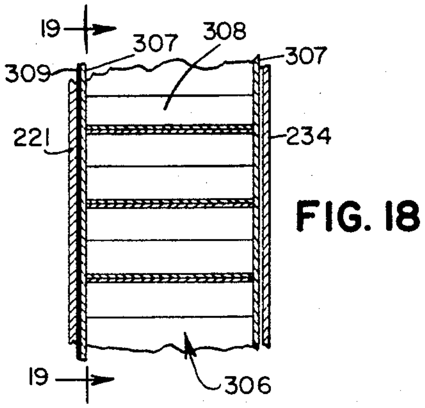
FIG. 18 is an enlarged view of the portion of the drawer head within the circle identified by the numeral 18 in FIG. 13.

The construction of one of the file drawers 200 will now be described with special reference to FIGS. 13 to 19 of the drawings. Referring first to FIG. 13, the file drawer 200 includes a bottom wall 201 that is generally rectangular in shape and has a width slightly less than the inner width of the cabinet case 101 and a length slightly less than that of the cabinet case 101, the longitudinally extending inner edges of the bottom wall 201 carrying side walls 202 integral therewith and extending upwardly therefrom substantially normal thereto and substantially parallel to each other. Provided centrally in the bottom wall 201 is an index rod recess comprising a pair of downwardly directed flanges 203 joined at the bottom by a lower wall 204, a pair of upstanding rear index flanges 205 being provided as well as an index rod tab 206, all disposed substantially normal to the lower wall 204 for holding the rear end of the index rod as will be described more fully hereinafter.

Figures 51, 52:
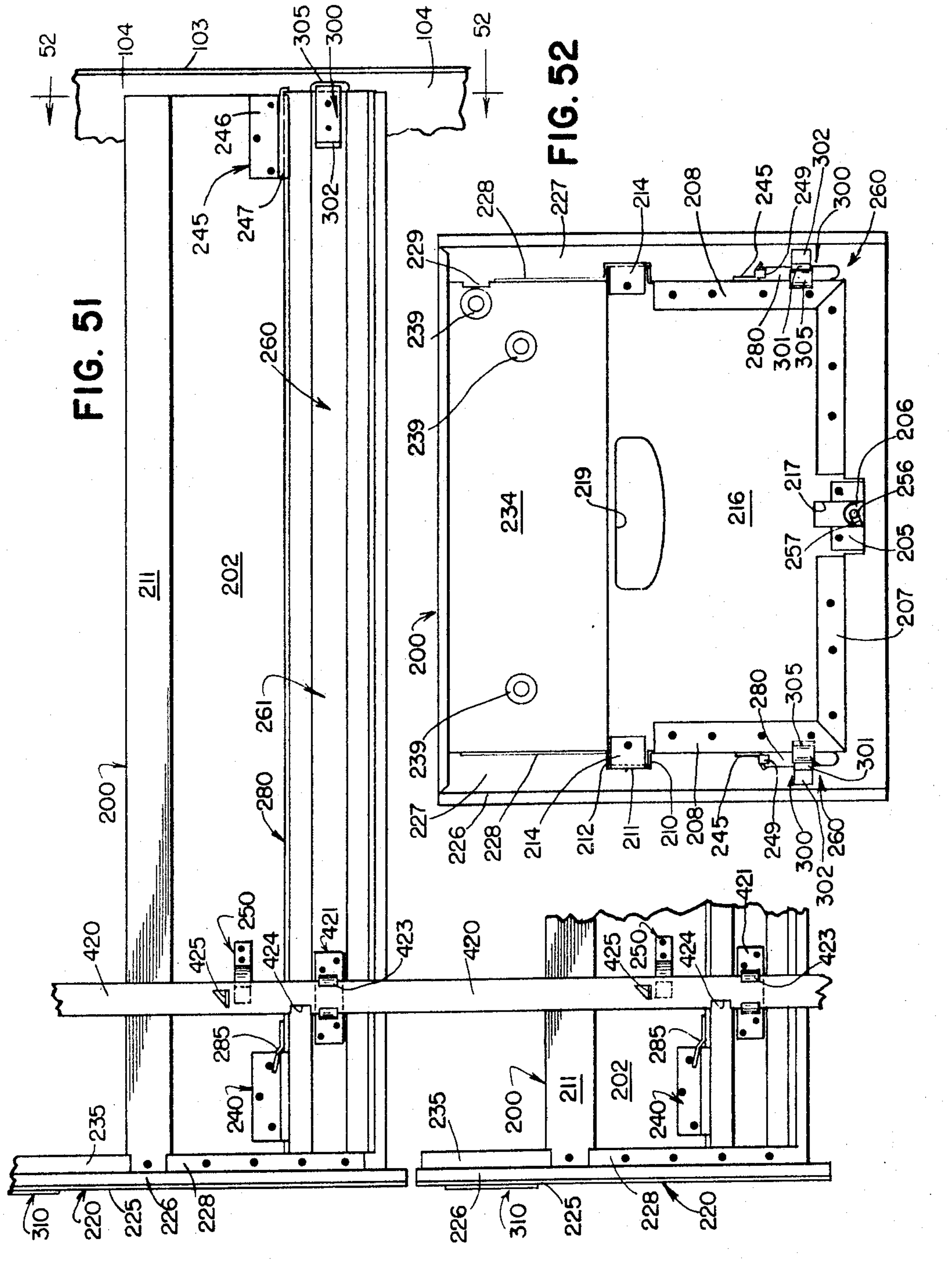
FIG. 51 is a fragmentary view in vertical section through the file cabinet as seen along the line 51—51 of FIG. 3.
FIG. 52 is a rear view of one of the drawers in FIG. 51 as seen along the line 52—52 thereof.

There further are provided rear bottom flanges 208 and rear side flanges 207 disposed substantially normal respectively to the bottom wall 201 and the side walls 202 (see FIG. 52 also). The upper edges of the side walls 202 carry thereon outwardly directed holding flanges 210 that in turn carry on the outer edges thereof upstanding flanges 211 which in turn carry on the upper edges thereof an inwardly directed top flange 212 carrying on the inner edge thereof a dependent retaining flange 213, all as will be described more fully hereinafter. The rear end of the upstanding flanges 211 also carry inwardly directed flanges 214 (see FIG. 52) and the holding flanges 210 have a plurality of substantially rectangular slots 215 formed therein for a purpose to be described more fully hereinafter.

Figure 32:
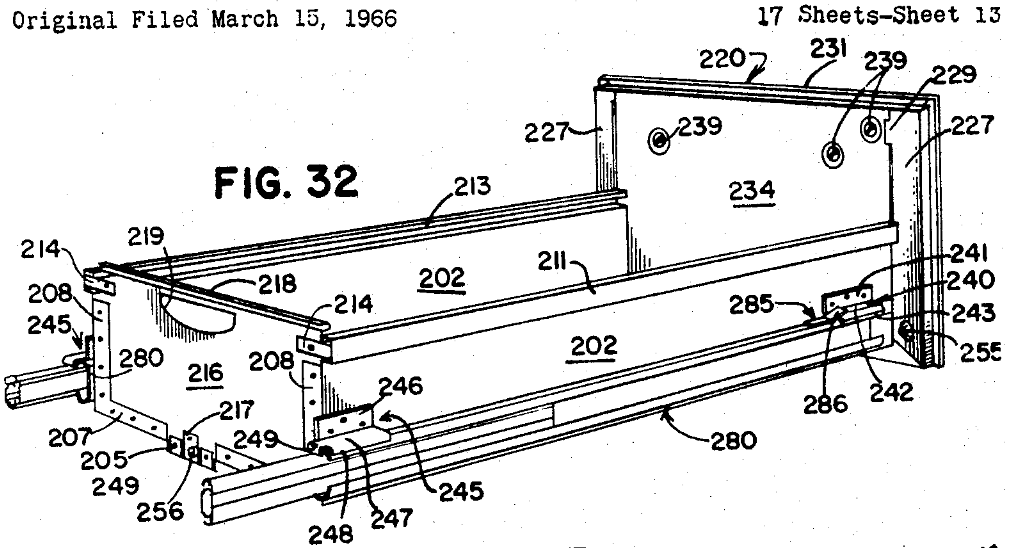
FIG. 32 is a rear perspective view of a file drawer and the associated suspension structure therefor.
Figure 33:
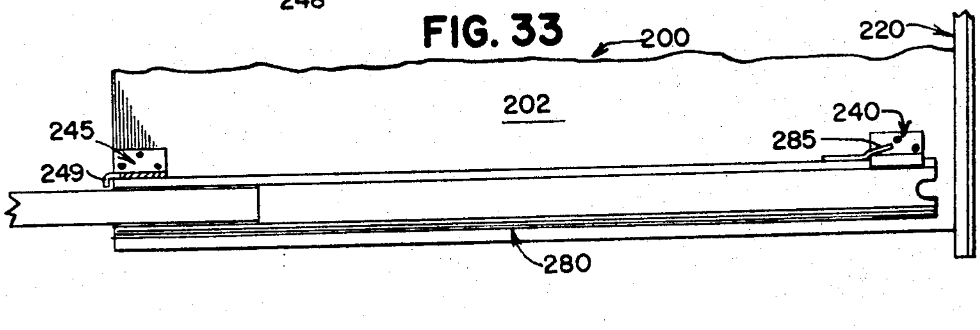
FIGS. 33 to 35 are diagrammatic side elevational views of FIG. 32 illustrating the removal of the drawer from the suspension structure therefor.
Figure 34:
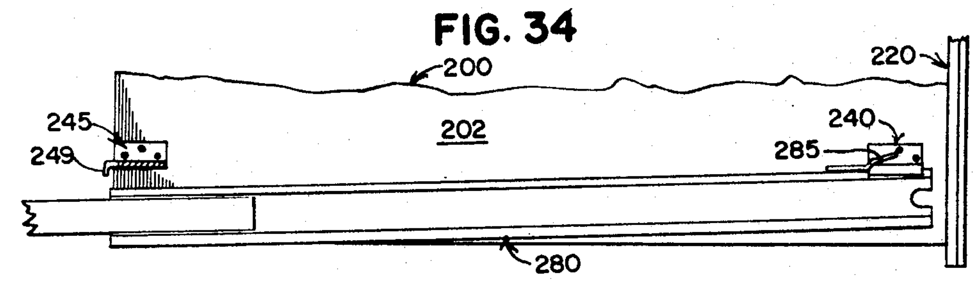
Figure 35:
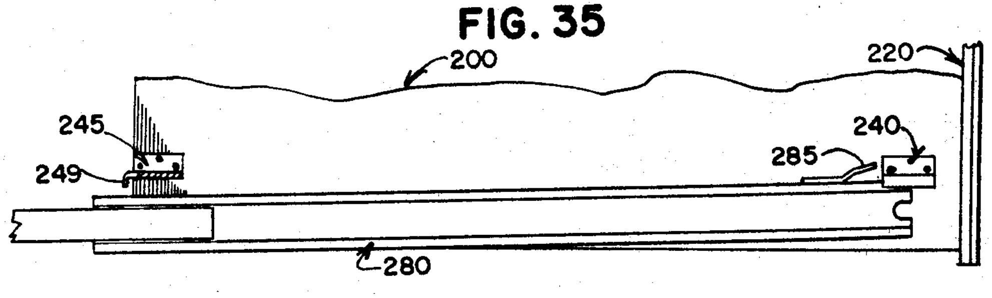

The rear of the drawer 200 is closed by a rear wall 216 (see FIG. 32) which is suitably secured as by welding to the various flanges 205, 207, 208 and 214 substantially to close all the space at the rear of the drawer 200 below the top flanges 212, the exception being a slot 217 in the lower end thereof above the index rod tab 206. The upper edge of the rear wall 216 carries a forwardly directed U-shaped top flange 218 and disposed immediately therebelow and centrally of the rear wall 216 is an opening 219 to receive the hand of a user therethrough for manipulating the drawer 200 as will be described more fully hereinafter.

The forward end of the drawer 200 is closed by a drawer head 220 (see FIG. 14) that includes an outer front wall 221 that is essentially rectangular in shape, the lower end of the wall 221 extending below the bottom wall 201 and the lower wall 204 and having on the lower edge thereof a rearwardly directed bottom flange 222 on the rear edge of which is an upturned flange 223 extending upwardly to the underside of the bottom wall 201 and carrying a rearwardly directed attachment flange 224 thereon which is suitably secured to the forward portion of the bottom wall 201 as by welding. Formed on the side edges of the outer front wall 221 are side flanges 225 (see FIG. 3) that are directed rearwardly and carry on the rear edges thereof rearwardly and inwardly directed flanges 226 that are adapted to be disposed adjacent to the side flanges 110 when the drawer 200 is in the closed position thereof, and the inner edges of the flanges 226 carry on inwardly directed back flange 227 thereon, the back flange 227 carrying a rearwardly directed side attachment flange 228 and an inwardly directed holding tab 229 thereon. The upper end of the outer front walls 221 carries a rearwardly and slightly downwardly directed top flange 231 carrying on the rearmost edge thereof a downturned holding flange 232, the front wall 221 and the flanges 231 and 232 cooperating to form a substantially U-shaped retaining portion.

Disposed inwardly and spaced from the outer front wall 221 is an inner front wall 234 having side flanges 235 extending forwardly toward the outer front wall 221, a bottom flange 236 also extending forwardly toward the outer front wall 221 and a top flange 237, the outer edge of the top flange 237 having an upstanding flange 238 thereon disposed within the holding flange 232 on the outer front wall 221. It will be seen that the inner front wall substantially closes the space between the drawer side walls 202 and closes the rear of the drawer head 220. Finally, there is formed on the inner front wall 234 three inwardly directed embossments 239 which have fastener receiving openings therethrough for mounting of the latch structure as will be described more fully hereinafter.

Figure 19:
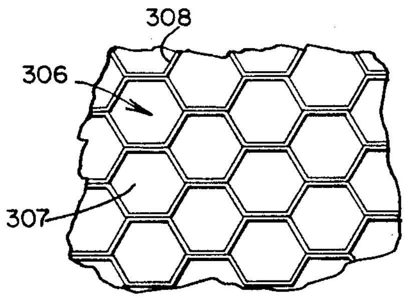
FIG. 19 is a view in vertical section along the line 19—19 of FIG. 18.
Figure 17:
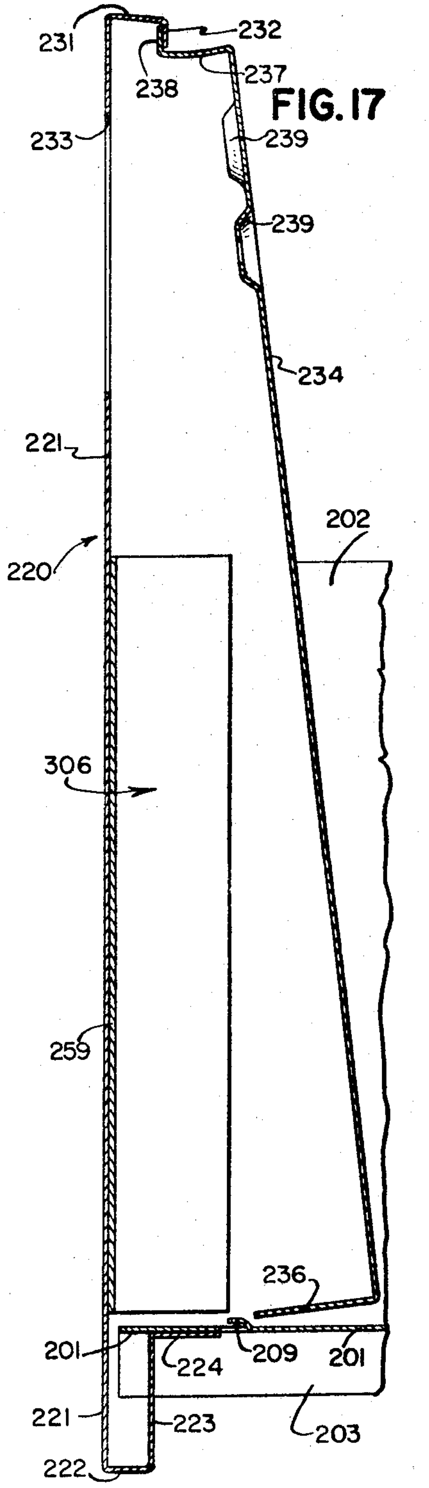
FIG. 17 is a fragmentary schematic view illustrating an assembly of the inner wall of the drawer head.

Further details of the assembly of the outer front wall 221 and the inner front wall 234 will now be described with particular reference to FIGS. 15 to 19 of the drawings. In the assembled condition of the drawer head 220, the flange 238 at the upper end of the inner front wall 234 is disposed against the forward surface of the flange 232 and the lower end of the inner front wall 234 is disposed behind a pair of projections 209 struck upwardly from the bottom wall 201. There further is disposed between the front walls 221 and 234 a filler 306 of cellular construction and formed of a paper product including a pair of outer layers 307 (see FIG. 18) and adhesively secured to an inner body 308 of honeycomb construction and more specifically formed by suitably bent strips of paper having adjacent surfaces glued together as is best illustrated in FIG. 19. The filler 306 extends substantially the entire distance between the side walls 202 and from the bottom wall 201 upwardly to a point spaced below the combination pull and latch structure 310 to be described hereinafter. There further is provided a body of mastic 309 between the front surface of the filler 306 and the inner surface of the outer front wall 221 throughout substantially the entire adjacent areas thereof, whereby to rigidify the drawer head and to provide good sound deadening properties therefor. The mastic 309 is preferably a heavy bodied, short, water dispersed adhesive such as that sold under the trademark "W-870" by Armstrong Cork Co. or "EC-321" by Minnesota Mining & Mfg. Co.

There is further provided within each of the file drawers 200 a compressor plate 440 (see FIGS. 13 and 14), the compressor plate 440 serving to hold the material stored within the drawer 200 in the forward portion thereof and against the inner side of the drawer 200 in the usual manner. The compressor plate 440 includes a main body 441 which is generally rectangular in shape having square lower corners and having formed intermediate the height thereof a rearwardly disposed reinforcing rib 454 and having formed toward the upper end a rearwardly directed flange 442 carrying an upstanding flange 443 which in turn carries a forwardly directed flange 444 to which is integrally connected an upper body 445 having a U-shaped curved and reawardly extending handgrasp portion 446 on the upper end thereof including an inturned flange 447 disposed therebeneath for reinforcement purposes. There further is provided in the flange 443 a pair of openings (not shown) by which a pair of guide brackets 450 are attached to the compressor plate 440, the righthand one of the openings being elongated to permit adjustment. It will be understood that two of the guide brackets 450 are provided and are disposed on the opposite sides of the compressor plate 440 and are substantially identical in construction, one being the mirror image of the other. As illustrated, each of the guide brackets 450 includes an attachment flange 451 which extends laterally of the drawer 200 and fits between the flanges 442 and 444 of the compressor plate 440 and against the flange 443 thereof, the attachment flanges 451 having an opening (not shown) therein to receive a screw 453 therethrough for attachment of the guide bracket 450 to the compressor plate 440. In passing it is noted that as illustrated the forward surfaces of the attachment flange 451 is in substantial vertical alignment with the forward surfaces of the main body 441 and the upper body 445 of the compressor plate 440. Integral with each of the attachment flanges 451 is a forwardly directed arm 455, the arm 455 being adapted to lie upon the holding flange 210 disposed toward the upper portion of the drawer side wall 202, the arm 455 extending upwardly into the space between the upstanding flange 211 and the inner flange 213, whereby the arm 455 is restrained in the vertical movement thereof by the holding flange 210 and the top flange 212. As may best be seen in FIG. 14, each of the holding flanges 210 has a series of openings 215 therein, the openings 215 being rectangular in shape. The lower surface of the arm 455 carries a downwardly and rearwardly directed front finger 457 thereon adapted to fit in one of the openings 215 and a downwardly and rearwardly directed rear finger 458 thereon adapted to fit in the adjacent rear one of the openings 215. The upper surface 456 of the arm 455 slopes downwardly to the rear from a point immediately below the top flange 212 at the forward portion thereof and downwardly to a point spaced just slightly above the flange 444 on the compressor plate 440 adjacent to the rear end thereof, whereby the arm 455 and the associated fingers 457 and 458 can be moved from the engaging or down position illustrated by solid lines in FIG. 13 and by the dashed lines in FIG. 14 to a disengaged or up position illustrated by the solid lines in FIG. 14, the arm pivoting about the lower front end thereof in a manner such as to clear the fingers 457 and 458 from the associated openings 215, thereby to permit longitudinal adjustment of the compressor plate 440 along the file drawer 200.

It is pointed out that such upward pivoting and longitudinal movement of the compressor plate 440 can be achieved by the user grasping the handgrasp portion 446 at the upper end of the compressor plate 440, whereby to move the parts to the solid line positions illustrated in FIG. 14. When the compressor plate 450 is in the substantially desired position thereof, the user needs simply to release the handgrasp portion 446, whereupon gravity will tend to return the compressor plate 440 to the lower position thereof and to dispose the fingers 457 and 458 upon the holding flange 210. If the lower ends of the fingers 457 and 458 are in vertical alignment with a pair of adjacent openings 215, then the fingers 457 and 458 will fall thereinto, thereby fixedly to position the compressor plate 440 in the adjusted position with respect to the drawer 200. On the other hand, if the fingers 457 and 458 are not positioned vertically above an adjacent pair of openings 215, then they will fall upon the upper surface of the holding flange 210, and will be moved rearwardly therealong due to the pressure of the material contained between the drawer head 220 and the compressor plate 440, and as soon as the fingers 457 and 458 are moved over an adjacent pair of the openings 215, the fingers 457 and 458 will fall thereinto under the urging of gravity, thereby automatically to position the compressor plate 440 within the drawer 200.

In order to mount the drawer 200 upon the suspension structure therefor, as will be more fully explained hereinafter, each of the drawer side walls 202 is provided adjacent to the forward end thereof with a drawer clip 240 (see FIGS. 32 to 35), the clip 240 including an attachment flange 241 that is suitably secured as by welding to the adjacent drawer side wall 202. Extending outwardly from the attachment flange 241 and disposed substantially normal thereto is a support flange 242, the support flange 242 carrying on the outer end thereof a downturned retaining flange 243. A rear drawer clip 245 is also provided on each of the drawer side walls 202 adjacent to the rear thereof, the clip 245 including an attachment flange 246 secured as by welding to the associated drawer side wall 202. Extending outwardly from the lower edge of the attachment flange 246 and disposed substantially normal thereto is a support flange 247, the support flange 247 carrying on the outer edge thereof a downturned retaining flange 248. There further is provided on the rear of the support flange 247 a downturned rear flange 249 for engaging the rear end of the associated drawer rail as will be described more fully hereinafter.

Figures 7, 8:
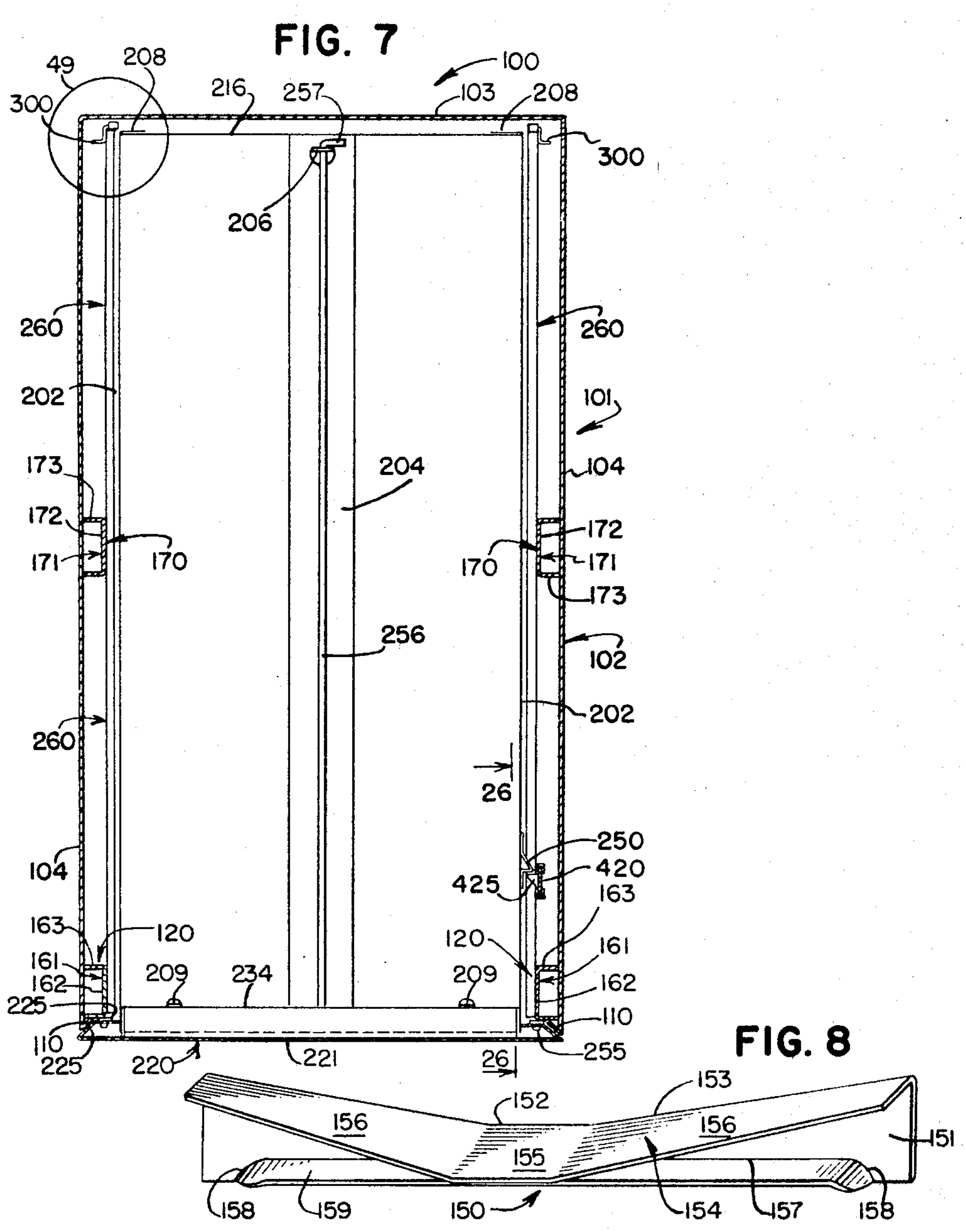
FIG. 7 is a view in horizontal section through the file cabinet of FIG. 3 along the line 7—7 thereof.
FIG. 8 is a rear perspective view of another one of the frame members used in the file cabinet case.
Figures 9, 10, 11, 12:
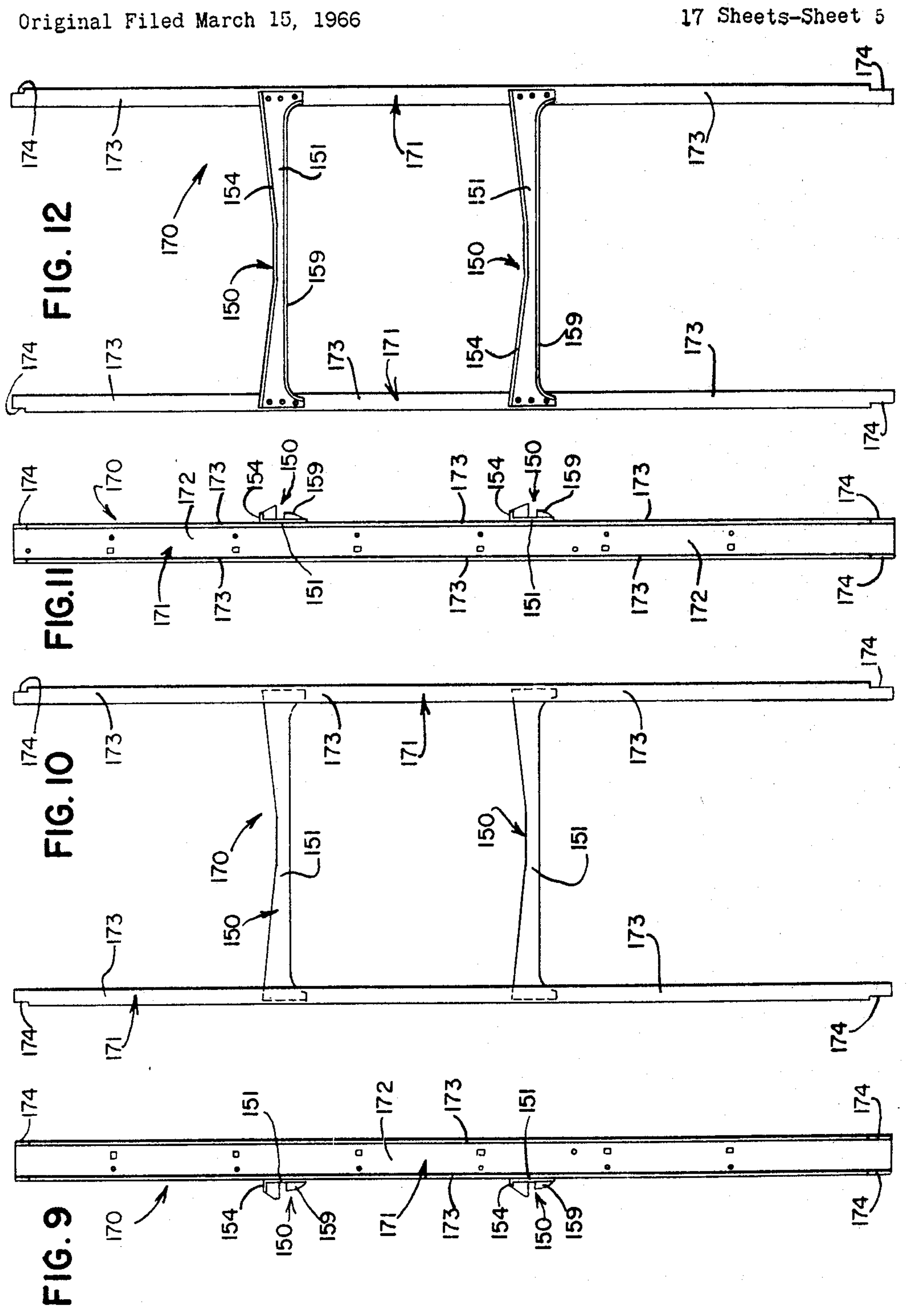
FIG. 9 is a side elevational view of the lefthand side of the center support of the case.
FIG. 10 is a front elevational view of the center support of the case.
FIG. 11 is a side elevational view of the righthand side of the center support of the case.
FIG. 12 is a rear view of the center support of the case.
Figure 26:
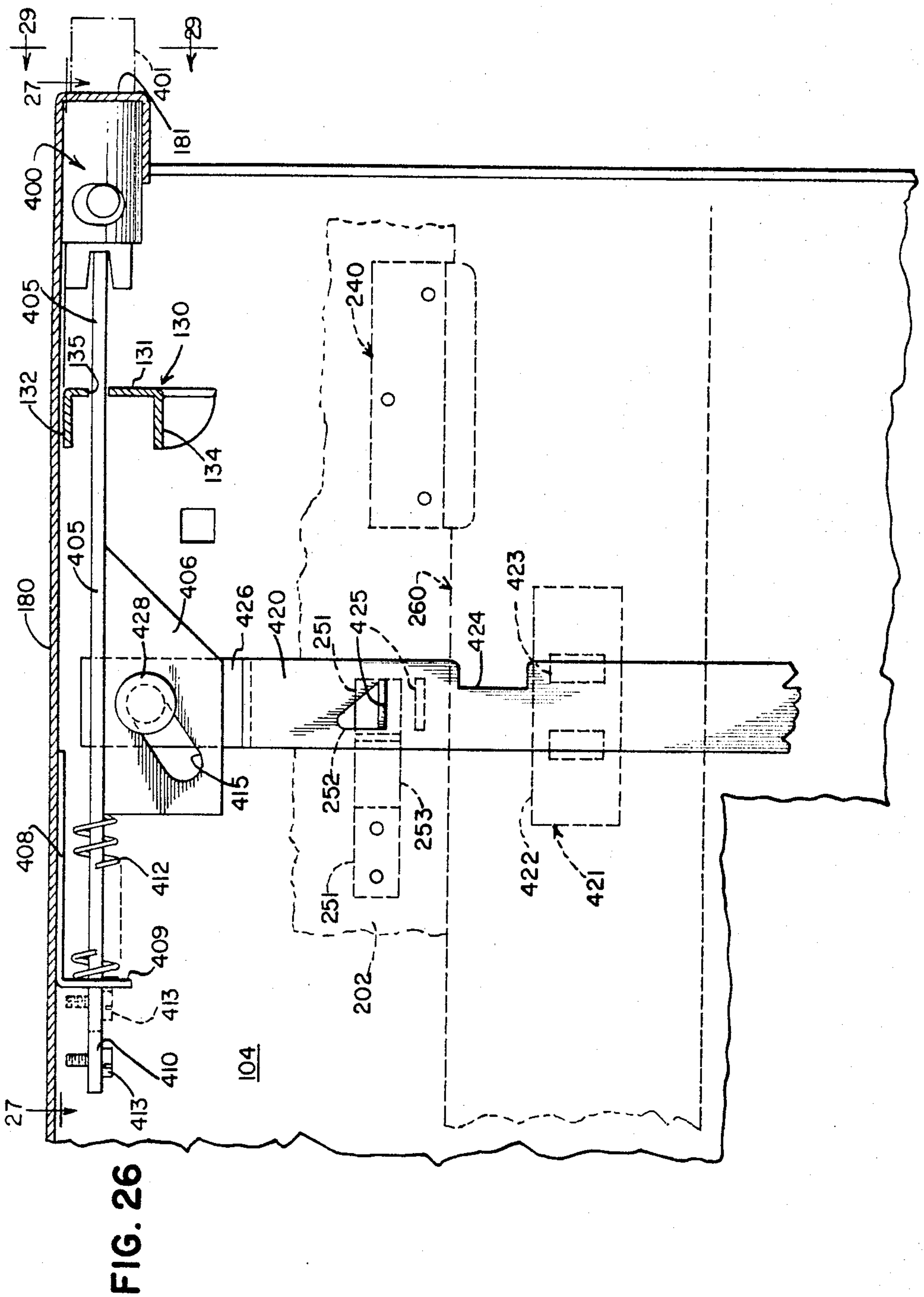
FIG. 26 is an enlarged fragmentary view in vertical section along the line 26—26 of FIG. 7 and illustrating a portion of the locking mechanism.

Referring now to FIGS. 7, 26 and 30 it will be seen that the righthand drawer side wall 202 as viewed from the front of the file cabinet 100 is provided thereon with a drawer stop or catch 250 that is utilized to lock the drawer 200 in the closed position thereof, as will be explained more fully hereinafter. The drawer catch 250 includes a pair of attachment flanges 251 which are suitably secured as by welding to the associated drawer side wall 202. Formed integral with the rear end of the forward attachment flange 251 and extending substantially normal thereto laterally from the side wall 202 is an abutment surface 252 which connects at the outer end thereof with an inwardly and rearwardly directed cam surface 253 that connects with the rear attachment flange 251. In FIG. 30, it also will be seen that each drawer back flange 227 carries thereon two rubber bumpers 255, one of the bumpers 255 being provided on each of the back flanges 227 on each side of the drawer head, whereby to absorb the shock of the closure of the drawer 200, the bumpers 255 engaging the front frame and particularly the upstanding front channels 121 and specifically the forward side flange 123 thereof. Disposed in the bottom of each of the drawers 200 is an index rod 256, see FIGS. 7, 13, 30 and 52 of the drawings, wherein it will be seen that the index rod 256 extends substantially the length of the drawer 200, and specifically from the drawer head 220 rearwardly through an opening in the index rod tab 206. The rear end of the rod 256 carries a retainer 257 disposed substantially at right angles to the axis of the rod 256 and extending laterally into the space between the rear wall 216 and the index rod tab 206, whereby to maintain the retainer 257 of the index rod 256 in the operative position thereof.

Each of the drawers 200 is provided with a drawer suspension 260 for each side thereof for the mounting of the drawer in the file cabinet case 101, the drawer suspensions 260 more particularly connecting the front frame 120 and the center support 170 of the case 101 with the associated drawer 200 and particularly the drawer clips 240 and 245 thereon. With the exception of certain minor details which will be pointed out hereinafter, the drawer suspensions disposed on the opposite sides of each of the drawers 200 are substantially identical, one being the mirror image of the other, and accordingly, like reference numerals have been applied to like parts throughout. The details of construction of the drawer suspensions 260 and the attachment thereof to the case 101 and to the drawers 200 are best seen in FIGS. 3, 26, 30 and 32 to 52, inclusive, of the drawings. Each drawer suspension 260 includes a case rail 261 which extends substantially the entire length of the file case 101, and as may be best seen in FIGS. 44 and 45 includes a main wall 262 that is substantially flat and has struck therefrom a pair of spaced apart mounting arms 263, the mounting arms 263 being directed forwardly and adapted to engage in substantially rectangular cutouts 124 in the front channel 121 and substantially rectangular cutouts 174 in the center channel 171, the arms 263 actually resting upon the lower portions defining the cutouts 124 and 174, respectively. There further are provided openings in the main wall 262 to receive therethrough fasteners such as the bolts 129 passing therethrough and engaging threaded openings 127 in the front channel 121 and threaded openings 177 in the center channels 171, shims 178 being provided between the case rail 261 and the associated channels 121 and 171, as required. Formed on the longitudinally extending edges of the main wall 262 are concave part circular inner ball races 266 that extend substantially the entire length of the main wall 262, ball retaining tangs 267 being provided at the forward ends of both of the inner ball races 266. There further is provided on the inner side of the main wall 262 and between the races 266 and intermediate the ends of the case rail 260 a bracket 268 secured as by welding to the main wall 262 and having disposed normal with respect thereto a stop arm 269.

Figures 36, 37, 38, 39, 40, 41, 42, 43, 44, 45:
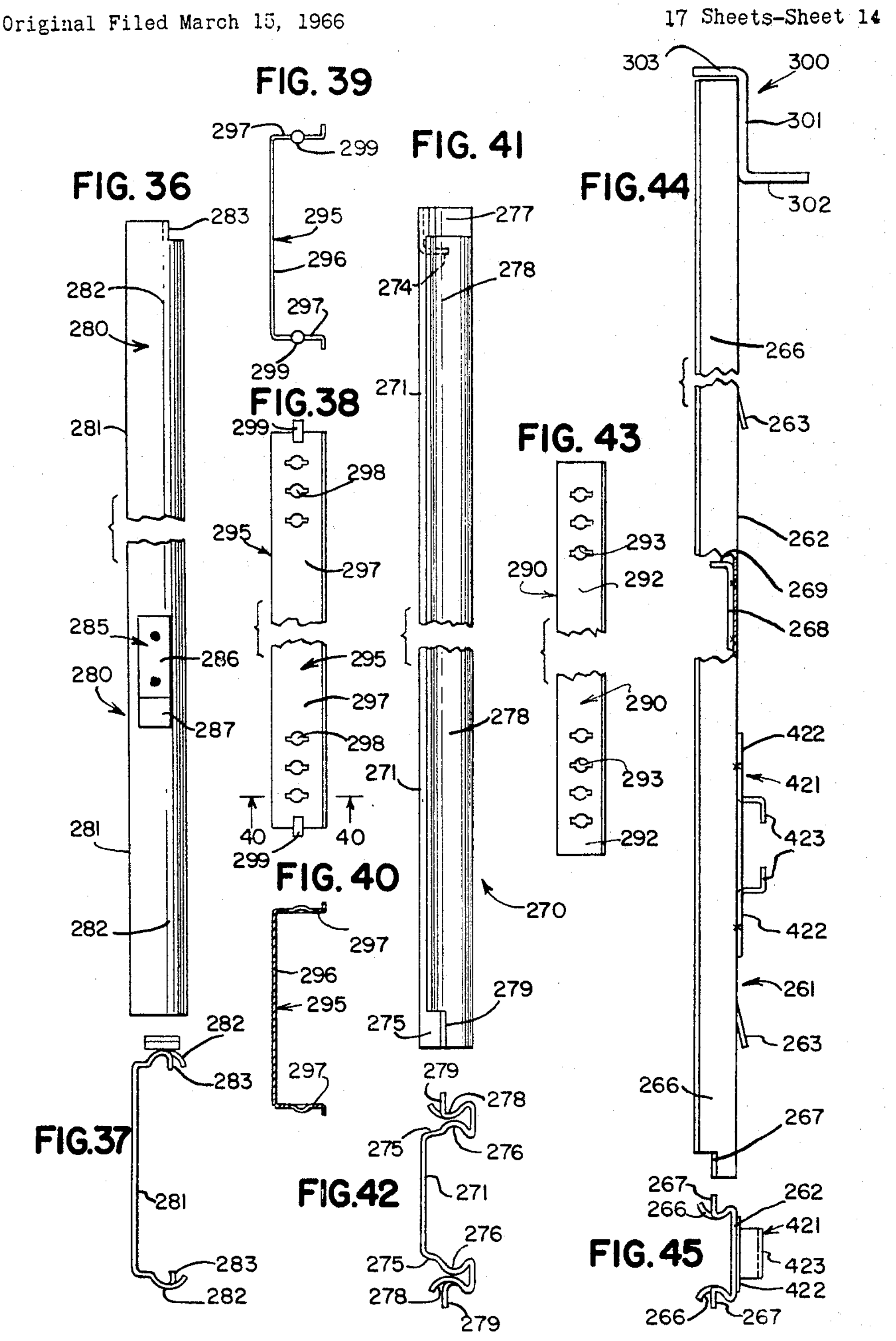
FIG. 36 is an enlarged side elevational view of the drawer rail of the suspension system.
FIG. 37 is an end elevational view of the drawer rail of FIG. 36.
FIG. 38 is a fragmentary side elevational view of the outer ball cage.
FIG. 39 is an end elevational view of the ball cage of FIG. 38.
FIG. 40 is a view in section along the line 40—40 of FIG. 38.
FIG. 41 is a fragmentary side elevational view of the neutral member.
FIG. 42 is an end elevational view of the neutral member of FIG. 41.
FIG. 43 is a fragmentary side elevational view of the inner ball cage.
FIG. 44 is a fragmentary side elevational view with certain parts broken away of the righthand case rail.
FIG. 45 is an end view of the case rail of FIG. 44.
Figures 46, 47, 48:
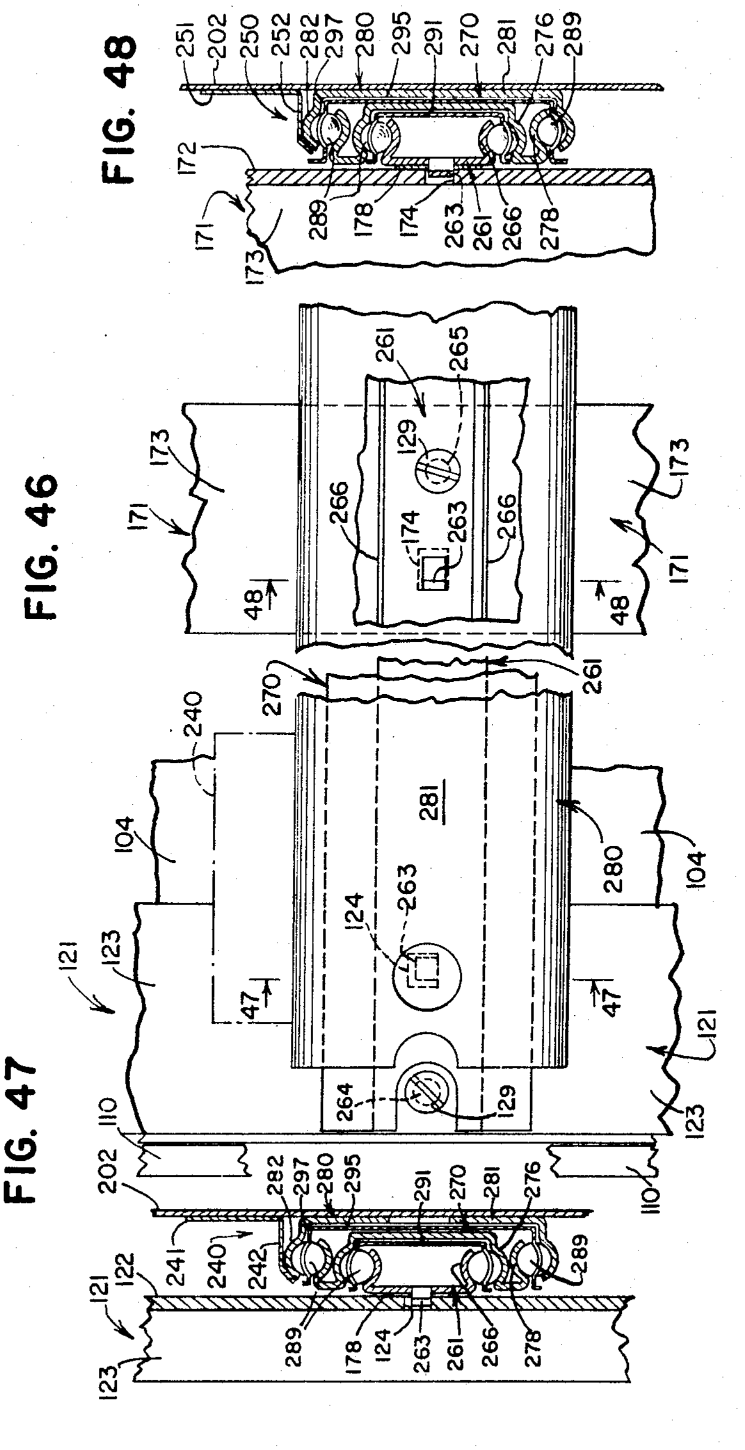
FIG. 46 is an enlarged fragmentary view of the drawer suspension system illustrating the interconnection of the various parts thereof.
FIG. 47 is a fragmentary view in vertical section along the line 47—47 of FIG. 46.
FIG. 48 is a fragmentary view in vertical section along the line 48—48 of FIG. 46.
Figure 49:
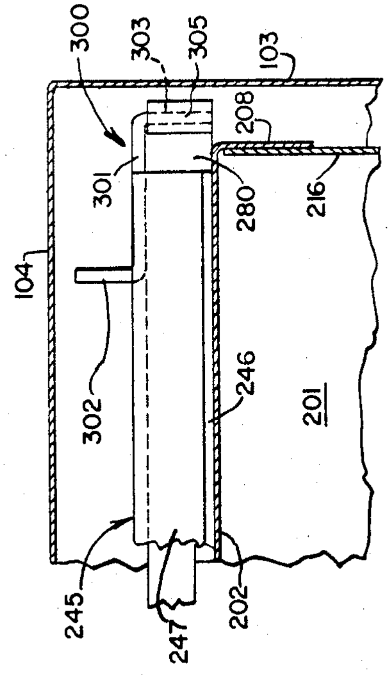
FIG. 49 is an enlarged plan view of the parts enclosed within the circle designated 49 in FIG. 7.
Figure 50:
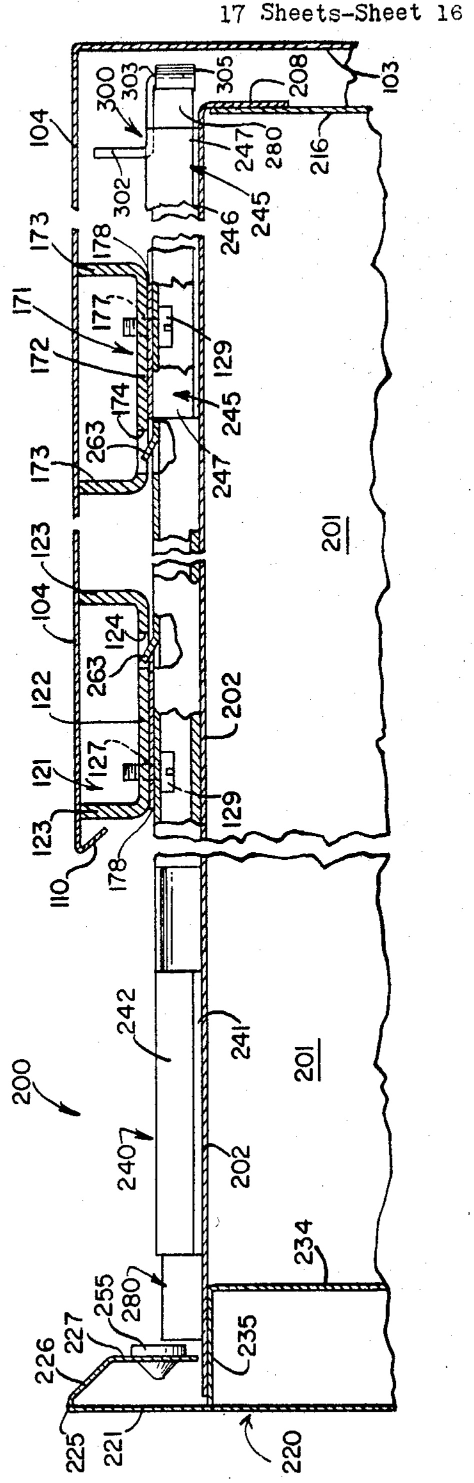
FIG. 50 is an enlarged fragmentary view in horizontal section through the lefthand side of the file cabinet case as seen along the line 50—50 of FIG. 3.

As may be best seen in FIGS. 47 and 48, there is disposed about the case rail 261 a neutral member 270, the details of construction of which are illustrated in FIGS. 41 and 42. The neutral member 270 includes a main wall 271 that is disposed vertically in use and substantially parallel to the main wall 262 but spaced outwardly therefrom. Formed on the rear end of the neutral member 270 is a struckout arm 274 which is adapted to engage the stop arm 269 on the case rail 261 to limit the outward movement of the neutral member 270 with the case rail 261. Formed on the longitudinally extending edges of the main wall 271 are laterally and outwardly extending flanges 275 which carry outer ball races 276 to cooperate with the inner ball races 266 on the case rail 261. At the rear end of the neutral member 270, inwardly disposed tangs 277 are provided to close the rear ends of the races 276. Extending upwardly and downwardly from the outer edges of the outer ball races 276 are outwardly directed inner ball races 278 that extend substantially the entire length of the neutral member 270 and are closed at the forward ends by outwardly directed tangs 279.

Disposed about the neutral member 270 and cooperating therewith is a drawer rail 280, the details of construction of which may be best seen in FIGS. 36 and 37. The drawer rail 280 includes a main wall 281 that is disposed substantially vertically in use and spaced outwardly with respect to the main wall 271 of the neutral member 270.

The longitudinally extending edges of the main wall 281 carry outer ball races 282 that cooperate with the inner ball races 278 upon the neutral member 270, tangs or stops 283 being provided at the rear end of the drawer rail 280 to cooperate with bumpers to be described more fully hereinafter. Mounted upon the upper outer race 282 is a drawer bracket 285 including an attachment flange 286 that is suitably secured as by welding to the drawer rail 280 and having formed integral therewith and extending forwardly therefrom a retaining arm 287 adapted to overlie and engage the associated drawer clip.

Disposed between the various sets of inner and outer races are ball bearings 289. A first pair of sets of ball bearings is maintained in the operating position by an inner ball cage 290, see FIGS. 43, 47 and 48, the inner ball cage 290 including a main wall 291 having a pair of outwardly directed flanges 292 on the upper and lower edges thereof having ball receiving openings 293 therein, the inner ball cage 290 maintaining two sets of ball bearings 289 in position, the one set being disposed between the upper inner ball race 266 and the cooperating upper outer ball race 276 and the other set being disposed between the lower inner ball race 266 and the cooperating outer lower ball race 276.

A second pair of sets of ball bearings 289 is held in the operative position by an outer ball cage 295 having a main wall 296 having outwardly directed flanges 297 thereon having ball receiving openings 298 therein for maintaining the associated ball bearings in the desired operative position. More specifically, the outer ball cage 295 maintains a first set of ball bearings in position between the upper inner ball race 278 and the cooperating upper outer ball race 282 and a second set of ball bearings between the lower inner ball race 278 cooperating lower outer ball race 282. Further, there is provided on each end of the outer ball cage 295 a bumper 299 formed of a suitable resilient material such as rubber, the forward bumper 299 of the outer ball race 295 engaging the tangs or stop arms 279 on the neutral member 270 and the rearmost bumper 299 engaging the stop arms 283 on the drawer rail 280, thereby to limit the maximum distance that the drawer rail 280 can move outwardly with respect to the neutral member 270.

There further is provided on the rear end of the case rail 261 a Z-bracket 300, the details of construction of which are best seen in FIGS. 44 and 49 to 52. As illustrated, the bracket 300 includes a main wall 301 that is disposed substantially vertically and is suitably secured as by welding to the rear end of the main wall 262 of the case rail 261. An outturned reinforcing flange 302 is formed on the forward edge of the main wall 301 and a stop flange 303 is formed on the rear edge of the main wall 301 and extends inwardly, i.e., in the opposite direction from the flange 302. The stop flange 303 is further provided with a rubber bumper 305 thereon which engages the rear of the neutral member 270 to absorb the shock of closing the associated drawer 200.

It will be understood that in the construction of the file cabinet 100, the drawer suspensions 260 are first mounted upon the case 101 and specifically upon the front frame 120 and the center support 170 thereof by inserting the mounting arms 263 into the associated openings in the respective front and center channels 121 and 171. To mount the associated drawer 200 upon its drawer suspensions 260, the drawer rails 280 and the parts connected and driven thereby are pulled to the outermost positions thereof with respect to the cabinet case 101. The drawer 200 is then placed in the approximate position over the drawer rails 280 and the front drawer clips 240 are lowered upon the drawer rails 280 until they are resting thereupon and in front of the drawer brackets 285. The rear end of the drawer 200 and specifically the rear drawer clips 245 are then dropped upon the upper surface of the drawer rails 280. The drawer 200 is then shifted rearwardly with respect to the drawer rails 280, whereby to move the front drawer clips 240 under the drawer brackets 285 and to move the rear drawer clips 245 rearwardly until the downturned flange 249 drops behind the rear of the associated drawer rail 280. The drawer 200 is now mounted in the operative position upon the drawer rails 280.

As the drawer 200 is moved toward the closed position within the cabinet case 101, the drawer rail 280 moves inwardly and upon engagement of the rear end thereof with the stop arm 273 will cause the neutral member 270 also to move inwardly until the stop arm 273 thereon engages the bumper 305 carried by the case rail 261, the bumpers 255 on the rear of the drawer head 220 finally abutting against the front channel 121 to stop inward movement of the drawer 200. If the drawer 200 is now pulled outwardly toward its fully extended position, eventually the bumpers 299 on the outer ball cage 295 will engage the stops 283 on the rear of the drawer rail 280 and the stops 279 on the forward end of the neutral member 270, and ultimately the stop arm 289 via the rubber bumper on the case rail 261 will engage the stop arm 274 on the neutral member 270, thereby to establish the final outer position of the drawer 200 with respect to the cabinet case 101.

An important feature of the present invention resides in the structure for mounting the drawer 200 upon the drawer rails 280 as described above, whereby the drawer 200 can be readily removed therefrom. Referring to FIGS. 32 to 35 of the drawings, there is diagrammatically illustrated the simple manner in which the drawer 200 can be removed from the suspensions 260 therefor. First the drawer 200 is preferably pulled to the outermost position thereof, after which the user grasps the rear of the drawer through the handhold 219 in the rear wall 216 and lifts upwardly until the downturned flanges 249 on the rear drawer clips 245 are raised above the upper surfaces of the drawer rails 280. Then the entire drawer is shifted forwardly until the front drawer clips 240 are disengaged from beneath the drawer brackets 285, after which the drawer 200 can be removed from the file cabinet 100. In order to remount the drawer 200 upon the suspensions 260 therefor, the process is simply reversed as has been described above.

Yet another important feature of the present invention resides in the fact that all of the parts of the suspension structures 260 are formed of sheet metal rolled or otherwise shaped to the form described and illustrated herein, the only parts not so formed being the several bumpers and the ball bearings. More specifically, the case rail 261 including the Z bracket 300 thereon, the neutral member 270, the drawer rail 280, the ball cage 290 and the ball cage 295 are all formed of sheet metal shaped as illustrated and described.

Each of the drawers 200 is provided with the combined pull, latch and label holder structure 310, the details of construction of which are best seen in FIGS. 20 to 25 and 30 of the drawings, wherein it will be seen that there is provided a latch housing 311 that is generally rectangular in the front elevational view and completely closes the opening 233 provided therefor in the drawer head outer wall 221. As illustrated, the latch housing 311 is formed as a section of a continuous metallic extrusion, the preferred material of constructiong being aluminum, the extrusion being cut to fit within the vertical side edges of the rectangular opening 233. More particularly there is provided a main housing wall 312 arranged vertically and generally rectangular in shape and spaced rearwardly with respect to the drawer head outer wall 221 and disposed against the drawer head inner wall 234, the housing main wall 312 having formed integral with the lower edge thereof a bottom wall 313 also extending the entire width of the opening 233, the juncture between the main wall 312 and the bottom wall 313 being curved as illustrated. Integral with the forward edge of the bottom wall 313 is an upstanding lower front wall 314 that extends upwardly from a point below the lower edge of the opening 233 upwardly to a point slightly thereabove and being provided on the upper edge thereof with a forwardly directed and downturned flange 318 which overlies the lower edge of the opening 233. The lower front wall 314 also has formed intermediate the upper and lower ends thereof and on the inner surface thereof a pivot groove 315 that extends the width of the housing 311 and is adapted to receive a latch bar as will be described more fully hereinafter. There further is provided a stop flange immediately adjacent to the pivot groove 315 to limit the upward movement of the associated latch bar as will be described more fully hereinafter. Finally, there is provided on the upper inner surface of the lower front wall 314 an upwardly and outwardly inclined pull surface 316 that is adapted to be contacted by the hand of a user in moving the associated drawer 200 between the open and closed positions thereof.

Formed integral with the upper edge of the main wall 312 and extending forwardly therefrom is a top wall 319, the top wall 319 extending forwardly to a position disposed substantially in vertical alignment with the associated drawer head outer wall 221 and carrying on the forward edge thereof a label holder generally designated by the numeral 320. The label holder 320 more particularly includes a top front wall 321 that extends a short distance downwardly with respect to the top wall 319 and has on the lower edge thereof an outwardly and upwardly extending front flange 322 which is adapted to receive therein to be supported thereby the lower edge of an associated label 345. The upper edge of the top front wall 321 carries a rearwardly and upwardly directed flange 323 which carries on the upper edge thereof an upper wall 324, the upper wall 324 extending forwardly to the inner surface of the associated drawer head outer wall 221 and carrying on the forward edge thereof a downturned front wall 325 that in turn carries on the lower edge thereof an outwardly and upwardly directed flange 326, whereby the associated edge of the drawer head outer wall 221 is received between the wall 325 of the flange 326, the front wall 325 having an inner surface 327 against which is disposed the upper front portion of the associated label 345.

The top wall 319 further carries thereon latch guide mounting structure generally designated by the numeral 330 and including an integral upstanding rear flange 331 disposed forwardly a short distance with respect to the housing main wall 312 and a front flange 332 extending upwardly from the top wall 319 and spaced rearwardly a short distance from the top wall 321. Associated with the flanges 331 and 332 are associated beads 333 and 334, respectively that extend upwardly from the top wall 319 and are spaced from the adjacent associated flange a short distance to provide therebetween corresponding grooves 334 and 336. A portion of the latch guide mounting structure 330 is also carried by the upper wall 324 which has on the rear end thereof a downturned rear flange 337 which forms with the flange 323 a downwardly directed groove 338 therebetween. The grooves 335, 336 and 338 are useful in mounting an associated latch guide as will be described more fully hereinafter.

There is provided within the latch housing 311 and pivotally mounted thereon a latch bar 340 in the form of an elongated continuous extrusion including a substantially flat body carrying on the forward edge thereof a part-circular hinge portion 341 adapted to be received in the pivot groove 315, whereby to mount the latch bar 340 on the latch housing 311. Reinforcement is provided for the latch bar 340 in the form of a parallel reinforcing beads 342 disposed on the lower surface thereof and extending the length thereof. The ends of the latch bar 340 extend beyond the ends of the associated housing 311, and the lefthand end thereof is provided with a bendable tongue 343 that receives and holds an actuating cable as will be described more fully hereinafter.

Figure 25:
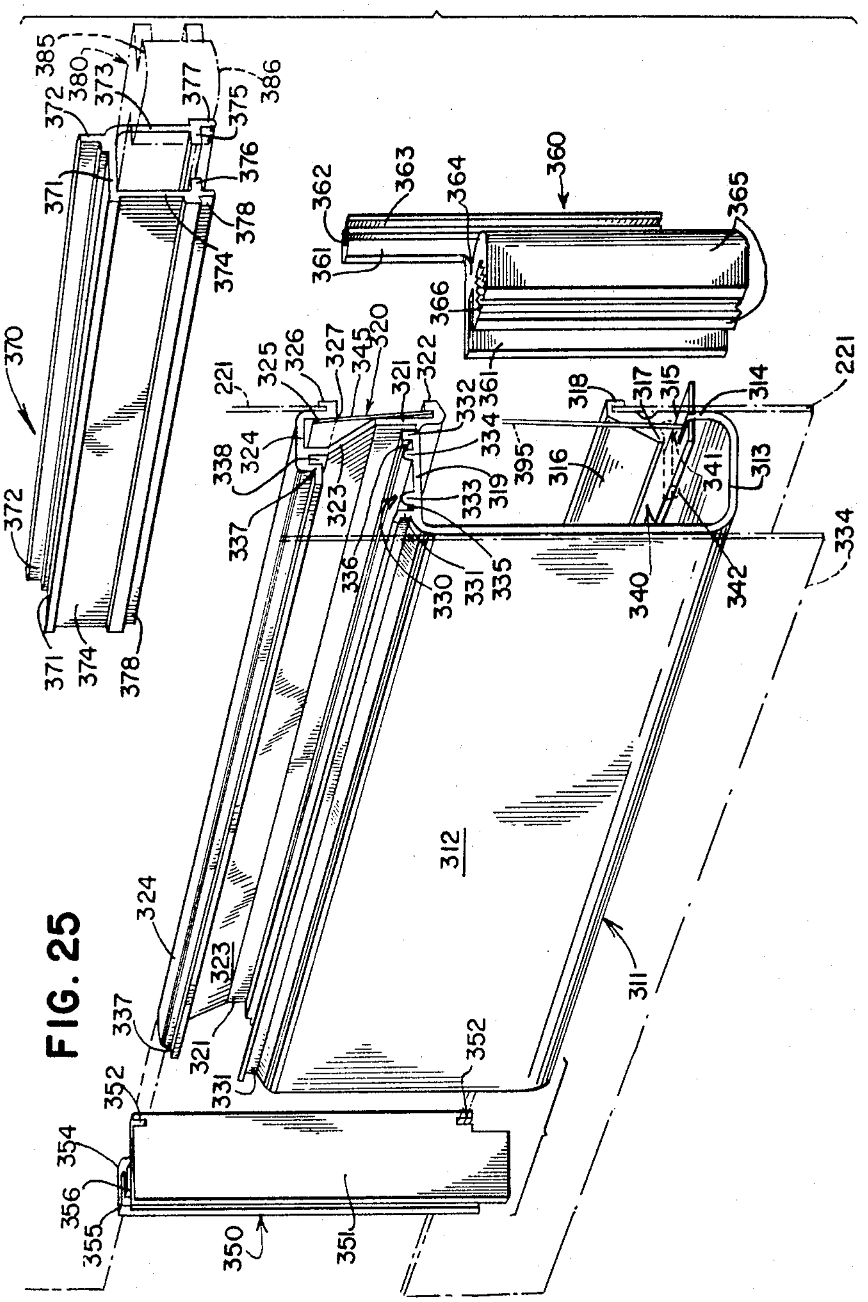
FIG. 25 is an enlarged exploded view in perspective of the parts forming the combination pull and latch illustrated in FIGS. 20 to 24.

The ends of the latch housing 311 are closed by a pair of housing ends 350 and 360, the structure of the housing ends 350 and 360 being best seen in FIGS. 25 and 30. Referring first to the housing end 350 that is disposed to the right as the latch structure is viewed from the front thereof, there is provided a main end wall 351 that substantially closes the associated end of the main housing 311 and particularly the portion thereof disposed above the latch bar 340, i.e., the latch bar 340 abutting against the lower end of the housing 350 when the latch bar 340 is in the upper or latching position thereof. There are provided adjacent to the upper and lower forward edges of the end wall 351 notches 352 which fit over the material surrounding the associated opening 233 in the drawer head outer wall 221, whereby to form a neat fit therewith, the outer surface of the end wall 351 carrying a vertically extending groove 353 which receives the vertical edge of the drawer head outer wall 221 about the opening 233 therein. Formed integral with the housing end wall 351 is a mounting structure 354 including a pair of vertically extending and rearwardly directed spaced apart mounting flanges 355, the flanges 355 having vertically extending ribs 356 on the inner facing surfaces thereof, which ribs 356 can be readily engaged by the threads of a suitably threaded fastener, and more specifically there is provided a fastener 357 extending through an associated embossment 239 on the drawer head inner wall 234 to mount the housing end 350 thereon. Referring to the housing end 360 that is disposed to the left as the latch structure is viewed from the front thereof, there is provided a main end wall 361 that substantially closes the associated end of the main housing 311 and particularly the portion thereof disposed above the latch bar 340, i.e., the latch bar 340 abutting against the lower end of the housing 360 when the latch bar 340 is in the upper or latch position thereof, the end wall 361, however, having a notch or cut out portion terminating adjacent to the top wall 319 to permit the latch guide 370 to extend thereabove as will be described more fully hereinafter. There are provided adjacent to the upper end lower forward edges of the end wall 361 notches 362 which fit over the material surrounding the associated opening 233 in the drawer head outer wall 221, whereby to form a neat fit therewith, the outer surface of the end wall 361 carrying a vertically extending groove 363 which receives the front end edge of the drawer head outer wall 221 about the opening 233 therein. Formed integral with the housing end wall 361 is a mounting structure 364 including a pair of vertically extending and rearwardly directed spaced apart mounting flanges 365, the flanges 365 having vertically extending ribs 366 on the inner facing surfaces thereof, which ribs 366 can be readily engaged by the threads of a suitably threaded fastener, and more specifically there is provided a fastener 367 extending through the associated embossment 239 on the drawer head inner wall 234 to mount the housing end 360 thereon.

Mounted in the latch guide mounting structure 330 is a latch guide 370 which extends outwardly and to the left from the latch structure as viewed from the front and beyond the left housing end 360. The latch guide 370 includes a top wall 371 which carries thereon an upstanding flange 372 which is adapted to be received in the groove 338 on the housing 311. Extending downwardly from the top wall 371 is an integral front wall 373 and an integral rear wall 374, the walls 373 and 374 being disposed substantially parallel to each other. Adjacent to the lower ends of the walls 373 and 374 there are provided inwardly directed support flanges 375 and 376, respectively, which are adapted to receive and support in sliding engagement thereon a latch as will be described more fully hereinafter. Finally, there is formed on the lower ends of the walls 373 and 374 downwardly directed mounting flanges 377 and 378 that are received in the grooves 336 and 335, respectively, on the latch housing 311. As described, the latch guide 370 is slidable inwardly and outwardly with respect to the latch guide mounting structure 330, and in order to position the latch guide 370 with respect to the housing 311, an embossment or inwardly deformed portion 339 is provided on the rear flange 331 limiting the movement of the latch guide 370 to the right as viewed in FIG. 20, the other end of the latch guide 370 being restrained by the drawer head inner front wall side flange 235 (see FIG. 30) and being steadied by an associated embossment 239 adjacent thereto.

Mounted within the latch guide 370 is a latch 380 preferably formed of a lubric material and specifically of a synthetic organic resin such as an acetal resin sold under the trademark "Delrin." The latch 380 includes a body 381 having a cylindrical opening 382 in the righthand end thereof so as to provide a wall 383 intermediate the end thereof and having an opening 384 therein. Extending laterally and to the left from the wall 383 is a reduced portion carrying on the outermost portion thereof a latch surface 385, a cam surface 386 being provided on the rear of the latch. Disposed adjacent to the righthand end of the latch 380 is a cable guide 390 that is also formed of a lubric material, the preferred material being a synthetic organic resin such as an acetal resin sold under the trademark "Delrin". The cable guide 390 has a guide groove 391 therein that extends upwardly on the righthand side thereof and across the top thereof, the cable guide 390 being held in position by a deformation 379 in the top wall 371 of the latch guide 370. Disposed in the latch opening 382 and between the latch wall 383 and the cable guide 390 is a coiled spring 392 under compression and continually urging the latch 380 to the lefthand position as viewed in FIG. 30, the latch in this position having the latch surface 385 disposed in an associated opening or slot 126 in the associated front channel 121 and specifically in the main wall 122 thereof adjacent to the forward side wall 123. In order to move the latch 380 from the latching position illustrated in FIGS. 20, 21 and 30 and to the release position illustrated in FIGS. 22 and 23, the latch cable 395 has been provided. One end of the cable 395 is connected to the lefthand end of the latch bar 340, and more specifically, is held thereon by the tongue 343 (see FIG. 24), the cable passing upwardly from the latch bar 340 across the cable guide 390 through the center of the spring 392 and outwardly beyond the latch wall 383 where it is secured as by an enlargement 396. Upon movement of the latch bar 340 from the position illustrated in FIGS. 20 and 21 to that illustrated in FIGS. 22 and 23, the latch 380 is moved from the lefthand position illustrated in FIG. 20 to the righthand position illustrated in FIG. 22, i.e., from the latching position thereof in engagement with the channel 121 to the release position thereof out of engagement with the channel 121.

It is further pointed out that all of the major parts of the combined pull and latch and label holder 310 are formed as portions of continuous metal extrusions, the preferred metal being aluminum. More specifically, the latch housing 311 is simply a section of a continuous extrusion having the cross section illustrated in FIGS. 21, 23 and 25. The latch bar 340 is also formed of a continuous extrusion which is further shaped to provide the outwardly extending ends thereon and the tongue 343 on the lefthand end. The housing ends 350 and 360 are likewise formed from continuous extrusions having a cross section best seen in FIG. 25 of the upper portion of the housing end 350, various portions of the extrusion being cut away to provide the particular shapes of the housing ends 350 and 360 indicated. Finally, the latch guide 370 is simply a section of a continuous extrusion having the cross section illustrated in FIGS. 21, 23 and 25.

In the use of the combined pull and latch and label holder 310, the pull surface 316 is readily engaged by the fingers of a user extending into the latch housing 311. Furthermore, the latch bar 340 is disposed immediately therebelow, and is readily pivotal from the latching position illustrated in FIG. 21 to the release position illustrated in FIG. 23, in which release position the latch bar 340 in effect forms a continuation of a downwardly sloping pull surface 316, whereby the user can readily simultaneously unlatch the drawer 200 and pull it forwardly grasping the pull surface 316 and the latch bar 340.

Figures 20, 21, 22, 23, 24:
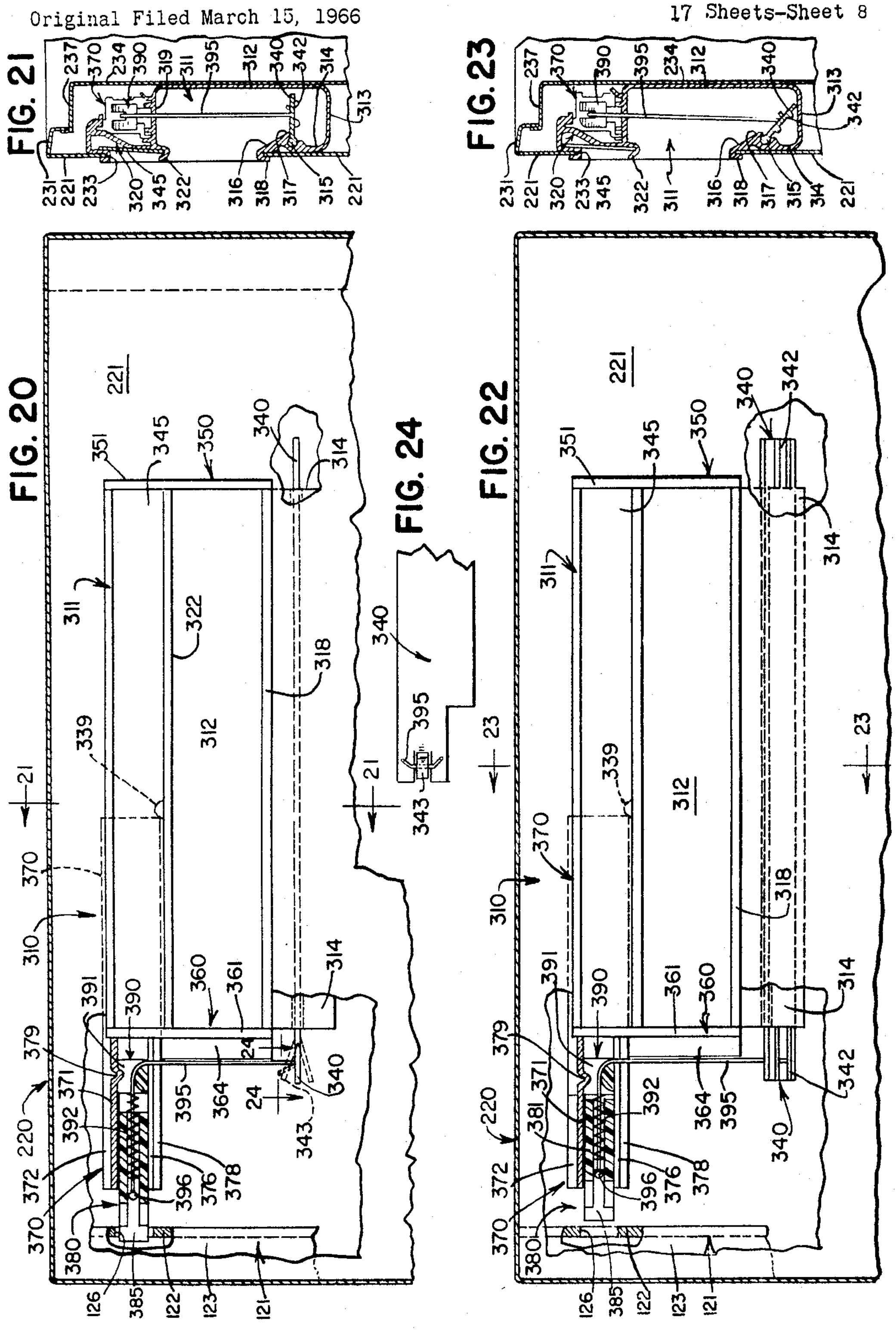
FIG. 20 is an enlarged view with certain portions broken away of the upper portion of a drawer forming a part of the present invention and illustrating particularly the combination pull and latch structure mounted thereon, the parts being shown in the latching position thereof.
FIG. 21 is a view in vertical section along the line 21—21 of FIG. 20.
FIG. 22 is a view similar to FIG. 20 showing the parts in the release position thereof.
FIG. 23 is a view in vertical section along the line 23—23 of FIG. 22.
FIG. 24 is an enlarged fragmentary view of one end of the latch bar as seen along the line 24—24 of FIG. 20.

Movement of the parts from the latching position illustrated in FIGS. 20 and 21 to the release position illustrated in FIGS. 22 and 23 is facilitated by the use of the flexible woven cable 395 in conjunction with the lubric cable guide 390, the latch 380 being retracted against the action of the spring 392, thereby further to compress the spring in preparation for the return of the latch 380 to the latching position thereof. In short, a relatively gentle downwardly pressure on the latch bar 340 serves to pivot it from the generally horizontal latching position of FIG. 21 to the downwardly directed release position of FIG. 23, thereby to withdraw the latch surface 385 from engagement with the associated channel 121. Upon release of the latch bar 340 by the user, the energy stored in the spring 392 serves to return the parts to the latching position, i.e., to move the latch 380 to the left to place the latch surface 385 in alignment with the keeper provided by the channel 121, and also to move the cable 395 and the attached latch bar 340 from position illustrated in FIGS. 22 and 23 to that illustrated in FIGS. 20 and 21. In the event that the latch 380 is in the latching position when the associated drawer 200 is moved from an open position toward the closed position thereof, the cam surface 386 (see FIG. 30) on the latch 380 will first engage the forward side flange 123 to move the parts to the right against the action of the spring 392, thus to permit the parts to move to the position illustrated in FIG. 30, after which the spring 392 returns the latch 380 to the latching position thereof, i.e. with the lefthand end thereof disposed in the opening 126 and with the latch surface 385 disposed behind the front flange 123 of the channel 121 which serves as a keeper therefor.

The manner in which the label 345 is placed in operative position will now be described with greater detail with special reference to FIGS. 21, 23 and 25. In order to insert the label 345 in the label holder 320, the upper end of the label 345 is first inserted upwardly into the recess bounded by the rearwardly directed flange 323 and the front wall 324 and the front wall 325, the upward extent of the recess being such as to permit the lower edge of the label 345 to be moved upwardly with respect to and above the front flange 322. The lower edge of the label 345 is then pushed inwardly until it is over the groove defined by the front wall 321 and the front flange 322, this movement of the label 345 also placing the upper portion of the label 345 against the rear surface 327. The entire label 345 can now be shifted downwardly to place the lower edge in the groove between the top front wall 321 and the front flange 322, the forward surface of the front wall 321 urging the upper portion of the label 345 against the surface 327 on the front wall 325. In order to remove the label 345, the above described steps are simply reversed, whereby readily to remove the label 345 from the label holder 320 thereof.

It is desirable to be able to lock the drawers 200 in the fully closed position thereof with respect to the case 101, and to this end a lock 400 and associated locking mechanism has been provided, the details of construction of which can be best seen by reference to FIGS. 1, 2, 7, 26 to 30, inclusive, and 51. More specifically, the lock 400 is mounted in the top 180 and specifically in the front flange 181 thereof and extends outwardly therefrom and includes a lock cylinder 401 movable between an inner locked position illustrated by the solid lines in FIGS. 26 and 27 of the drawings and an outer unlocked position illustrated by the dashed lines in FIGS. 26 and 27 of the drawings, the cylinder 401 being more specifically shiftable with respect to the front flange 181 and an L-shaped lock bracket 482 mounted thereon and adapted to guide the lock cylinder 401 in the movement thereof between the locked and unlocked positions thereof. It will he understood that the movement of the lock cylinder 401 between the locked and unlocked positions thereof is controlled by the operation of a key engageable in a key openng 403 provided in the lock cylinder 401 in the usual nanner. Connected to the lock cylinder 401 and movable herewith is a lock link 405 in the form of a substantially lat horizontally arranged body carrying a downturned side flange 406 thereon (see FIGS. 26 and 28, particuarly). The forward portion of the lock link 405 extends through the rectangular slot 135 in the associated top cross brace 130 to be supported and guided thereby and has a rearwardly directed extension 407 thereon extending through a like rectangular slot in an angle bracket 408 secured to the underside of the top 180 such as by welding and having a downturned flange 409 having the necessary rectangular slot therein. A second extension 410 is provided at the rear end of the lock link 405 and extends through the rectangular slot in the flange 409. Disposed between the lock link 405 and the flange 409 is a spring 412 under compression tending to urge the lock link 405 and the connected cylinder 401 outwardly or toward the unlocked position thereof. The extension 407 carries thereon a screw 413 which is adapted to engage the flange 409 to limit the outward movement of the lock link 405 and the attached lock cylinder 401.

Figures 27, 28, 29:
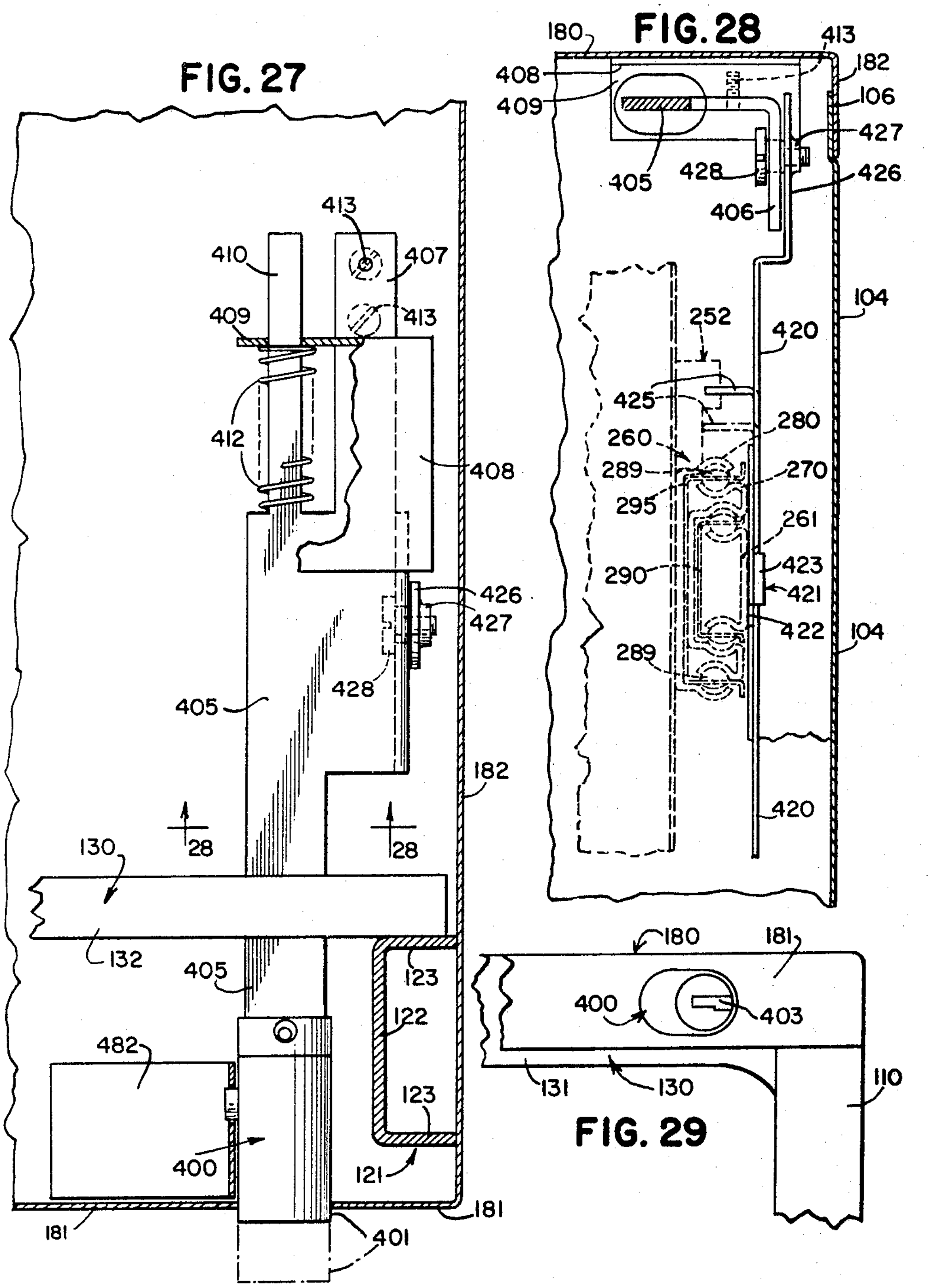
FIG. 27 is a partial view in horizontal section with certain portions broken away along the line 27—27 of FIG. 26.
FIG. 28 is a fragmentary vertical view along the line 28—28 of FIG. 27.
FIG. 29 is a fragmentary view of the upper righthand corner of the file cabinet case as seen along the line 29—29 of FIG. 26.

The lock link 405 is connected to a vertically arranged lock bar 420 mounted within the file cabinet case 104, the mounting being best illustrated in FIGS. 26, 28 and 51. The lock bar 420 is disposed generally vertically and is elongated to extend adjacent to the top 180 downwardly substantially to the bottom of the cabinet case 104 and is supported for vertical movement by a plurality of lock bar guides 421 mounted on the righthand ones of the case rails 261, each of the lock bar guides 421 more particularly including a flat plate 422 suitably secured as by welding to the associated case rail 261 and having struck therefrom a pair of opposed and spaced apart retaining flanges 423 that guide the lock bar 420 in vertical movement with respect thereto. From FIG. 26 it will be seen that the lock bar 420 has a notch 424 therein that can be utilized during the mounting of the bar 420 on the associated guide 421, each of the notches 424 being normally disposed well above the associated guide 421 so as not to interfere with the locking operation. There further are struck from the body of the lock bar 420 a plurality of lock tangs 425 (see FIG. 30 particularly) provided with a lock engaging surface 426 disposed rearwardly and adapted to engage the associated drawer catch 250, one of the tangs 425 being provided for each of the drawers 200.

Interconnection is provided between the upper end of the lock bar 420 and the lock link 405 so that movement of the lock cylinder 401 between the locked and the unlocked positions thereof moves the lock tangs 425 into and out of locking position with respect to the associated drawer catches or stops 250. To this end the upper end of the lock bar 420 is offset outwardly to provide an attachment portion 426. The side flange 406 on the lock link 405 has a rearwardly and downwardly extending diagonal slot 415 therein that receives therethrough a bolt 428 that engages a threaded embossment 427, thereby to provide an engagement between the lock link 405 and the lock bar 420. More specifically, when the lock link 405 is in the inner or locked position thereof, i.e., the locked position illustrated in FIGS. 26 and 27, the bolt 428 is in the upper end of the slot 415, thereby to hold the lock bar 420 in the upper or locked position thereof. Movement of the lock link 405 and the associated lock cylinder 401 to the outer or unlocked position illustrated by dashed lines in FIGS. 26 and 27 moves the bolt 428 to the lower end of the slot 415, thereby moving the lock bar 420 to the lower or unlocked position thereof. When the lock bar 420 is in the upper or locked position, the lock tangs 425 are in horizontal alignment with the drawer catches 250, and when the lock bar 420 is in the lower or locked position thereof, the lock tangs 425 are dispc below and out of horizontal alignment with the dra catches 250. Accordingly, the movement of the l cylinder 401 between the locked and unlocked posit: thereof serves to move the lock bar 420 and the associ: lock tangs 425 between the locking and unlocking p tions thereof, the spring 412 continually urging the p to the unlocked position thereof.

Figures 3A, 3B, 4A, 4B:
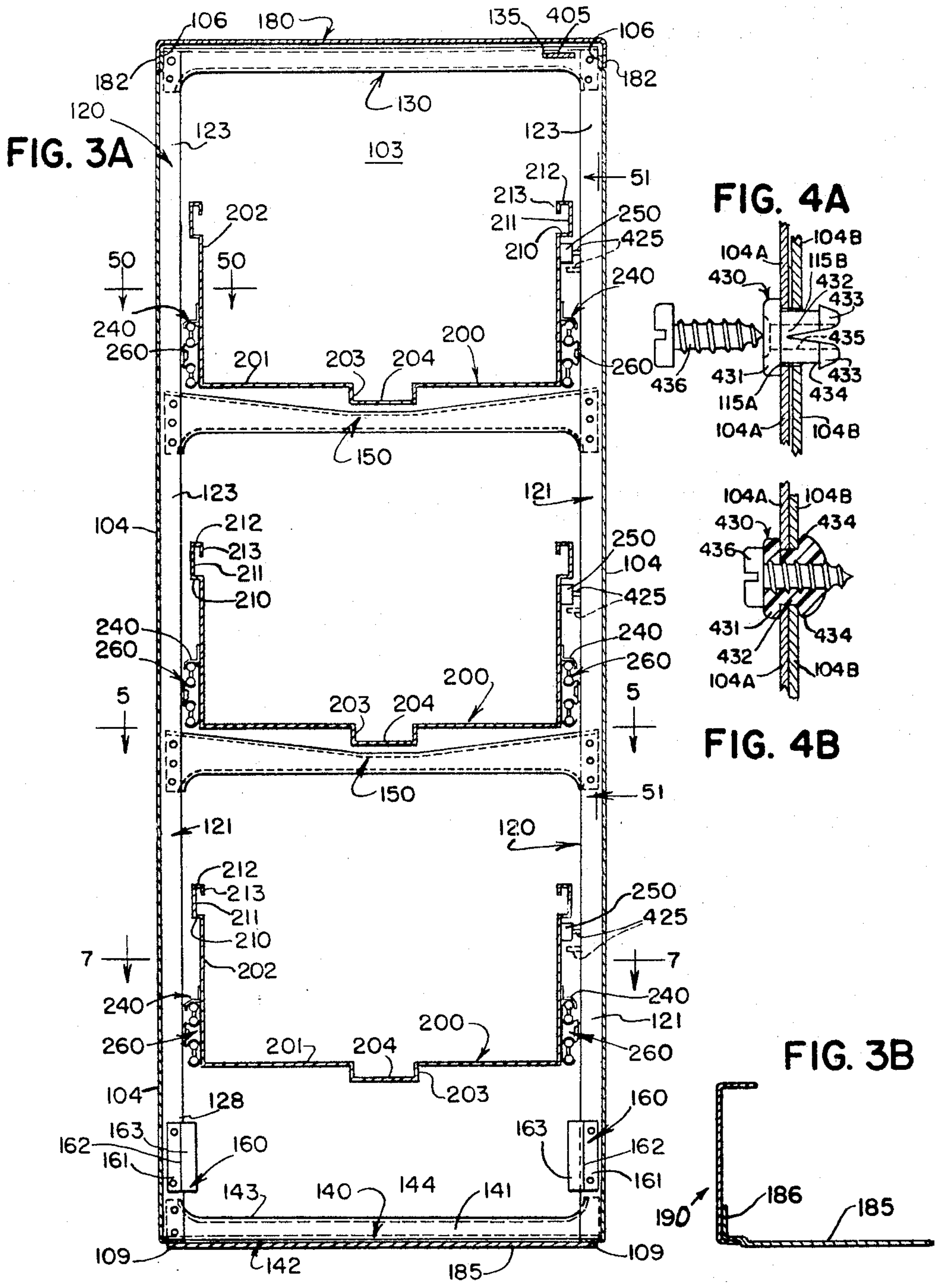
FIG. 3A is an enlarged view in vertical section along the line 3—3 of FIG. 1.
FIG. 3B is a fragmentary view in vertical section along the lines 3B—3B of FIG. 2, the bottom cross brace, the front frame and the side wall being omitted.
FIGS. 4A and 4B illustrate the interconnection of two file cabinet case walls to interconnect the same.
Figure 5:
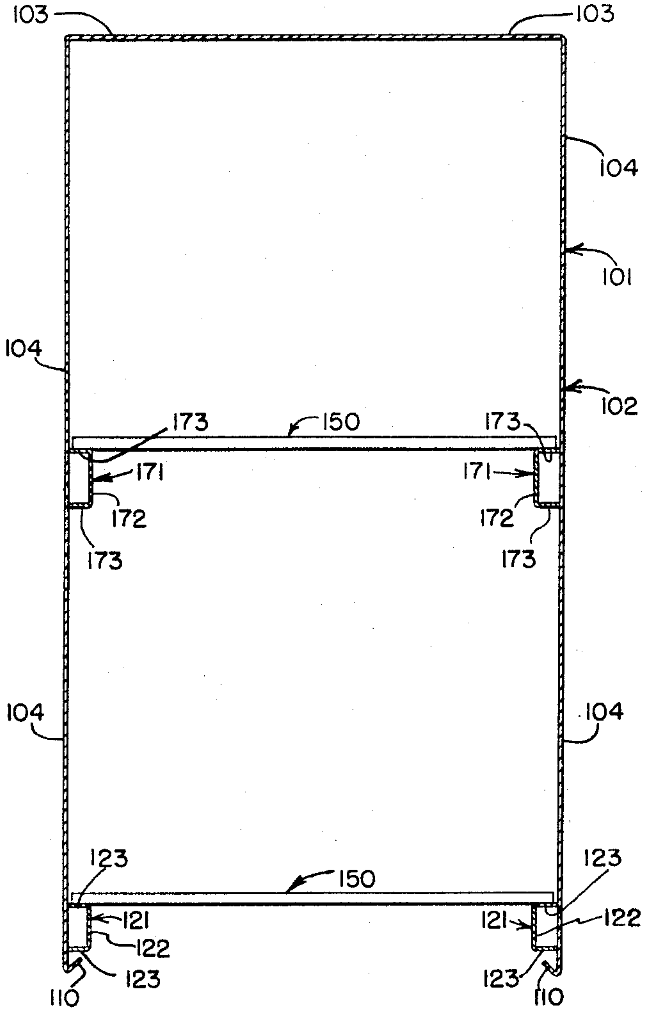
FIG. 5 is a view in horizontal section through the file cabinet of FIG. 3A along the line 5—5 thereof.
Figure 6:
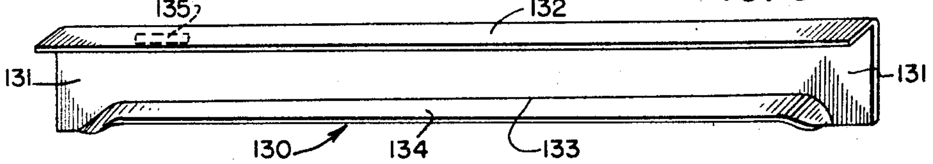
FIG. 6 is a rear perspective view of one of the frame members in the file cabinet.

Referring to FIGS. 4A and 4B, there is illustrated manner and construction by which two adjacent file c 101 can be joined in accordance with the present in tion. Prior to being disposed in juxtaposed relations the four knockouts 115 in the corner of the adjacent walls 104 are removed, there resulting four square o ings in each of the side walls 104. There then is inse through aligned pairs of the resultant openings a conne 430, each connector 430 including a head 431 disp against the inner surface of the adjacent side wall 1 and a shank 432 extending through the aligned open 115A and 115B, the shape of the shank 432 being : that the connector 430 will not turn in the associated o ings. The shank 432 more specifically includes a pai legs 433 that extend through the openings and carr the outer ends thereof abutment shoulders 434. Fin disposed centrally of the connector 430 is an opening that receives therethrough a fastener 436 such as a tapping screw. The connector 430 is preferably fo of a deformable material such as a synthetic org plastic resin, the preferred material being nylon r whereby upon the insertion of the fastener 436 anc tightening thereof as illustrated in FIG. 4B, the 431 is pressed against the adjacent surface of the side 104A and the shoulders 434 are pressed against th jacent surface of the side wall 104B, thereby firm interconnect the adjacent file cabinet cases 101.

Fundamentally, the file cabinet 100 is forme sheet metal with the exception of the several parts tioned during the above description. Furthermore sheet metal forming the various parts is of relatively gauge, as will be appreciated from the following exar of the gauge of the sheet metal utilized to form va parts of the file cabinet 100. For example, in a ty illustrative embodiment of the case 101, the body 1 formed of 20 gauge steel, the U-shaped channel are formed of 12 gauge steel as are the center su 170, the top 180 is formed of 20 gauge steel an bottom 185 is also formed of 20 gauge steel. In an trative example of the file drawer 200, the bottom wa and the side walls 202 and all of the integral parts th are formed of 24 gauge steel, the outer drawer head 221 is formed of 22 gauge steel, the inner front wal is formed of 24 gauge steel, the front drawer clips 24 the rear drawer clips 245 are formed of 16 gauge and the drawer catch 250 is formed of 18 gauge In a typical construction of the drawer suspension 26 case rail 261 is formed of 16 gauge steel, the neutral ber 270 is formed of 16 gauge steel, the drawer ra is also formed of 16 gauge steel.

From the above description it will be seen that has been provided an improved file cabinet, and sp ally an improved file cabinet which fulfills all c objects and advantages set forth above. More specif there has been provided an improved file cabine formed essentially of sheet metal, all of the parts simple in construction and economical in manufa The improved file cabinet includes an improved file net case having a new and novel front frame and frame or support and connection of the body t which prevents "racking" when one corner of th is lifted; there further is provided an improved connection between the body of the case and the t therefor, a layer of mastic being disposed thereb forming a firm bond as well as imparting good deadening qualities thereto.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A case for a file cabinet comprising a body including a rear wall and a pair of forwardly projecting side walls integral therewith and defining a front opening therebetween, a front frame positioned between said side walls at the forward ends thereof and completely surrounding said front opening and respectively secured to said side walls, a center support positioned between said side walls and disposed toward but spaced from and substantially parallel to said front frame and respectively secured to said side walls, and a top covering the area bounded by said rear wall and said side walls and having flanges extending downwardly around the periphery thereof and covering the adjacent upper ends of said rear wall and said side walls and secured thereto and extending forwardly beyond said front frame.

2. The case set forth in claim 1, wherein said front frame includes a pair of upstanding side channels that are U-shaped in cross section and have the free edges thereof disposed outwardly against the adjacent one of said side walls and secured thereto as by welding, a top cross brace that is substantially U-shaped in cross section interconnecting the upper ends of said channels and secured to the rear thereof, a bottom cross brace that is substantially U-shaped in cross section interconnecting the lower ends of said channels and secured to the rear thereof, and at least one center tie brace that is substantially U-shaped in cross section interconnecting said channels at points intermediate the ends thereof and secured to the rear side thereof.

3. The case set forth in claim 2, wherein said center support also carries a center tie brace that is substantially U-shaped in cross section interconnecting said center supports intermediate the ends thereof and in general horizontal alignment with said center tie brace on said front frame.

4. The case set forth in claim 2, wherein the flanges on said top cross brace and said bottom cross brace and said center tie brace all extend rearwardly.

5. The case set forth in claim 1, wherein the forward edges of said side walls carry vertically extending front flanges extending inwardly and rearwardly and disposed at an angle of approximately 45° with respect to the adjacent side wall.

6. The case set forth in claim 1, wherein said rear wall and said side walls carry on the upper ends thereof inwardly offset flanges that are disposed within the depending flanges on said top, whereby the outer surfaces of the depending flanges on the sides and rear of said top lie flush with and in the same plane as the adjacent side walls and rear wall of said body.

7. A case for a file cabinet comprising a body including a rear wall and a pair of forwardly projecting side walls integral therewith and defining a front opening therebetween, a front frame positioned between said side walls at the forward ends thereof and completely surrounding said front opening and including a plurality of projections extending outwardly toward the adjacent one of said side walls, first bodies of mastic disposed between said front frame and said side walls, said side walls being welded to said front frame at said projections thereon, a center support positioned between said side walls and disposed toward but spaced from and substantially parallel to said front frame and including a plurality of projections extending outwardly toward the adjacent one of said side walls, second bodies of mastic disposed between said center support and said side walls, said side walls being welded to said center support at said projections thereon, and a top covering the area bounded by said rear wall and said side walls and having flanges extending downwardl around the periphery thereof and covering the adjacen upper ends of said rear wall and said side walls an secured thereto and extending forwardly beyond said fron frame.

8. The case set forth in claim 7, wherein both said fron frame and said center support include a pair of verticall arranged channels substantially U-shaped in cross sectio and having the free edges thereof disposed outwardly an carrying said projections.

9. The case set forth in claim 7, wherein said bodies o mastic are formed of a heat curing resin that is at leas partially cured during the welding of said side walls t said front frame and said center support, thereby to provide bodies of sound deadening resin between said sid walls and said front frame and between said side wall and said center support and surrounding the weldment therebetween.

10. A case for a file cabinet comprising a body including a rear wall and a pair of forwardly projecting sid walls integral therewith and defining a front opening therebetween, a front frame positioned between said side wall at the forward ends thereof and completely surroundin said front opening and respectively secured to said sid walls, a center support positioned between said side wall and disposed toward but spaced from and substantiall parallel to said front frame and respectively secured t said side walls, bottom flanges respectively integral wit the bottom edges of said body and extending inwardl with respect thereto, a bottom wall mounted on said bottom flanges and secured thereto and including a fron flange extending upwardly between said side walls an covering at least a portion of said front frame, and a to covering the area bounded by said rear wall and said sid walls and having flanges extending downwardly around th periphery thereof and covering the adjacent upper ends o said rear wall and said side walls and secured thereto an extending forwardly beyond said front frame.

11. The case set forth in claim 10, and further comprising a pair of base clips mounted on said front fram adjacent to the lower ends thereof and extending outwardly therefrom, and a base secured to said base clip and extending downwardly and covering said bottom fron flange and having rearwardly directed side flanges thereon spaced inwardly with respect to said side walls.

12. The combination comprising a pair of file cabinet each including a body having a rear wall and a pair o forwardly projecting side walls integral therewith an defining a front opening therebetween, a front frame positioned between said side walls at the forward ends thereo and completely surrounding said front opening and respectively secured to said side walls, a center support positioned between said side walls and disposed toward bu spaced from and substantially parallel to said front fram and respectively secured to said side walls, a top coverin the area bounded by said rear wall and said side walls an having flanges extending downwardly around the periphery thereof and covering the adjacent upper ends of sai rear wall and said side walls and secured thereto and extending forwardly beyond said front frame; said cases being arranged in side by side position with the adjacen side walls thereof in facing relationship, said adjacent sid walls having a plurality of aligned sets of openings therethrough; a connecting member extending through each o said sets of aligned openings and including an enlarge head on one end thereof and a pair of legs on the othe end thereof provided with abutment shoulders dispose toward the adjacent side wall; and a fastener extendin through said connecting member and deforming said leg outwardly to urge said head into firm engagement with th adjacent side wall and to urge said abutment shoulder into firm engagement with the adjacent side wall, whereb firmly to interconnect said casings through the side wall thereof.

13. The combination set forth in claim 12, wherei prior to the interconnection of said cases knockouts are provided in the areas of said openings, thereby to present a solid side wall until it is desired to connect a pair of adjacent cases.

14. The combination set forth in claim 12, wherein said openings are substantially rectangular in shape and said connecting member has a complementary shape, whereby said fastener can be inserted by having access only to one side of said connecting member.

15. The combination set forth in claim 12, wherein said connecting members are formed of a synthetic organic plastic resin.

References Cited

UNITED STATES PATENTS

| | | | |
|---|---|---|---|
| 2,750,901 | 6/1956 | McClellan | 312—218 X |
| 2,808,309 | 10/1957 | Magester | 312—257 |
| 2,855,261 | 10/1958 | Wells et al. | 312—257 |
| 3,000,680 | 9/1961 | Zelenko | 312—111 |
| 3,123,416 | 3/1964 | Sovik | 312—195 |
| 3,183,049 | 5/1965 | Ericson et al. | 312—195 X |
| 3,275,392 | 9/1966 | Fiterman | 312—111 X |
| 3,314,740 | 4/1967 | Lappin et al. | 312—111 |

CASMIR A. NUNBERG, *Primary Examiner.*